(12) United States Patent
Chou et al.

(10) Patent No.: US 10,704,203 B2
(45) Date of Patent: Jul. 7, 2020

(54) ABSORBENT SHEETS HAVING HIGH ABSORBENCY AND HIGH CALIPER, AND METHODS OF MAKING SOFT, ABSORBENT SHEETS

(71) Applicant: GPCP IP Holdings LLC, Atlanta, GA (US)

(72) Inventors: Hung Liang Chou, Neenah, WI (US); Daniel H. Sze, Appleton, WI (US); Xiaolin Fan, Appleton, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 0 days.

(21) Appl. No.: 15/994,092

(22) Filed: May 31, 2018

(65) Prior Publication Data

US 2018/0274176 A1  Sep. 27, 2018

Related U.S. Application Data

(60) Continuation of application No. 15/469,618, filed on Mar. 27, 2017, now Pat. No. 9,988,766, which is a division of application No. 15/404,339, filed on Jan. 12, 2017, now Pat. No. 9,957,667, which is a division of application No. 15/191,785, filed on Jun. 24, 2016, now Pat. No. 9,611,591, which is a division of application No. 14/541,380, filed on Nov. 14, 2014, now Pat. No. 9,404,224.

(60) Provisional application No. 61/904,177, filed on Nov. 14, 2013.

(51) Int. Cl.
| | |
|---|---|
| *D21H 27/30* | (2006.01) |
| *D21H 27/40* | (2006.01) |
| *D21H 27/00* | (2006.01) |
| *D21F 11/00* | (2006.01) |
| *D04H 1/425* | (2012.01) |
| *G06T 15/08* | (2011.01) |
| *D21F 7/12* | (2006.01) |
| *D21F 7/08* | (2006.01) |

(52) U.S. Cl.
CPC ............ *D21H 27/30* (2013.01); *D04H 1/425* (2013.01); *D21F 7/08* (2013.01); *D21F 7/12* (2013.01); *D21F 11/006* (2013.01); *D21H 27/005* (2013.01); *D21H 27/007* (2013.01); *D21H 27/40* (2013.01); *G06T 15/08* (2013.01)

(58) Field of Classification Search
USPC ........................................................ 162/116
See application file for complete search history.

(56) References Cited

U.S. PATENT DOCUMENTS

| | | |
|---|---|---|
| 3,905,863 A | 9/1975 | Ayers |
| 3,953,638 A | 4/1976 | Kemp |
| 3,974,025 A | 8/1976 | Ayers |
| 4,095,622 A | 6/1978 | MacBean |
| 4,460,023 A | 7/1984 | Mullaney |
| 4,507,173 A | 3/1985 | Klowak et al. |
| 4,695,498 A | 9/1987 | Sarrazin et al. |
| 4,771,814 A | 9/1988 | Quigley |
| 4,784,190 A | 11/1988 | Mullaney |
| 4,892,781 A | 1/1990 | Penven |
| 4,940,630 A | 7/1990 | Penven |
| 4,979,543 A | 12/1990 | Moriarty et al. |
| 4,989,648 A | 2/1991 | Tate et al. |
| 5,026,587 A | 6/1991 | Austin et al. |
| 5,101,866 A | 4/1992 | Quigley |
| 5,117,865 A | 6/1992 | Lee |
| 5,158,118 A | 10/1992 | Tate et al. |
| 5,230,371 A | 7/1993 | Lee |
| 5,238,027 A | 8/1993 | Lee |
| 5,254,398 A | 10/1993 | Gaisser |
| 5,343,896 A | 9/1994 | Schroder et al. |
| 5,411,062 A | 5/1995 | Lee |
| 5,429,686 A | 7/1995 | Chiu et al. |
| 5,454,405 A | 10/1995 | Hawes |
| 5,456,293 A | 10/1995 | Ostermayer et al. |
| 5,499,026 A | 3/1996 | Liao et al. |
| 5,520,225 A | 5/1996 | Quigley et al. |
| 5,542,455 A | 8/1996 | Ostermayer et al. |
| 5,544,678 A | 8/1996 | Barrett |
| 5,549,790 A | 8/1996 | Van Phan |
| 5,555,917 A | 9/1996 | Quigley |
| 5,556,509 A | 9/1996 | Trokhan et al. |
| 5,609,725 A | 3/1997 | Van Phan |
| 5,620,565 A | 4/1997 | Lazorisak et al. |
| 5,674,663 A | 10/1997 | McFarland et al. |
| 5,690,149 A | 11/1997 | Lee |

(Continued)

FOREIGN PATENT DOCUMENTS

| | | |
|---|---|---|
| CA | 2426383 A1 | 10/2003 |
| CA | 2440263 A1 | 11/2004 |

(Continued)

OTHER PUBLICATIONS

Communication with extended European Search Report dated Jun. 8, 2017, issued in corresponding European Patent Application No. 14861889.5-1308.

(Continued)

*Primary Examiner* — Mark Halpern
(74) *Attorney, Agent, or Firm* — Laura L. Bozek

(57) ABSTRACT

A cellulosic sheet includes a single ply providing a first surface of the cellulosic sheet on one side and a second surface of the cellulosic sheet on a second side. The single ply has a caliper of at least about 130 mils/8 sheets, a basis weight of less than about 16 lbs/ream, and a dry machine direction/cross machine direction (MD/CD) tensile ratio of less than about 1.0.

17 Claims, 22 Drawing Sheets

(56) References Cited

U.S. PATENT DOCUMENTS

| | | |
|---|---|---|
| 5,694,980 A | 12/1997 | Quigley |
| 5,709,250 A | 1/1998 | Ward et al. |
| 5,709,775 A | 1/1998 | Trokhan et al. |
| 5,713,396 A | 2/1998 | Lee |
| 5,713,397 A | 2/1998 | Quigley |
| 5,776,312 A | 7/1998 | Trokhan et al. |
| 5,799,707 A | 9/1998 | Barrett et al. |
| 5,814,190 A | 9/1998 | Van Phan |
| 5,817,213 A | 10/1998 | Ostermayer et al. |
| 5,819,811 A | 10/1998 | Baker et al. |
| RE35,966 E | 11/1998 | Lee |
| 5,837,103 A | 11/1998 | Trokhan et al. |
| 5,853,547 A | 12/1998 | Ahrens et al. |
| 5,857,497 A | 1/1999 | Gaisser |
| 5,871,887 A | 2/1999 | Trokhan et al. |
| 5,897,745 A | 4/1999 | Ampulski et al. |
| 5,899,240 A | 5/1999 | Wilson |
| 5,925,217 A | 7/1999 | Kaufman et al. |
| 5,937,914 A | 8/1999 | Wilson |
| 5,954,097 A | 9/1999 | Boutilier |
| 5,975,148 A | 11/1999 | Lee |
| 5,988,229 A | 11/1999 | Quigley |
| 6,076,564 A | 6/2000 | Brüggemann et al. |
| 6,112,774 A | 9/2000 | Wilson |
| 6,140,260 A | 10/2000 | Johnson et al. |
| 6,148,869 A | 11/2000 | Quigley |
| 6,162,327 A | 12/2000 | Batra et al. |
| 6,200,419 B1 | 3/2001 | Phan |
| 6,223,780 B1 | 5/2001 | Kaldenhoff |
| 6,227,256 B1 | 5/2001 | Quigley |
| H1974 H | 7/2001 | Lee et al. |
| 6,296,736 B1 | 10/2001 | Hsu et al. |
| 6,332,480 B1 | 12/2001 | Best |
| 6,334,467 B1 | 1/2002 | Barrett et al. |
| 6,349,749 B1 | 2/2002 | Quigley |
| 6,378,565 B1 | 4/2002 | Best |
| 6,436,234 B1 | 8/2002 | Chen et al. |
| 6,592,714 B2 | 7/2003 | Lamb |
| 6,649,026 B2 | 11/2003 | Lamb |
| 6,660,129 B1 | 12/2003 | Cabell et al. |
| 6,743,333 B2 | 6/2004 | Lamb |
| 6,752,907 B2 | 6/2004 | Edwards et al. |
| 6,808,790 B2 | 10/2004 | Chen et al. |
| 6,810,917 B2 | 11/2004 | Stone |
| 6,834,684 B2 | 12/2004 | Martin et al. |
| 6,837,275 B2 | 1/2005 | Josef et al. |
| 6,837,276 B2 | 1/2005 | Josef et al. |
| 6,899,790 B2 | 5/2005 | Lee |
| 6,923,219 B2 | 8/2005 | Shteiyer |
| 6,953,065 B2 | 10/2005 | Martin et al. |
| 6,978,809 B2 | 12/2005 | Quigley |
| 7,007,722 B2 | 3/2006 | Quigley et al. |
| 7,048,012 B2 | 5/2006 | Martin et al. |
| 7,094,320 B1 | 8/2006 | Phan |
| 7,114,529 B2 | 10/2006 | Johnson et al. |
| 7,124,781 B2 | 10/2006 | Fahrer et al. |
| 7,198,067 B2 | 4/2007 | Collegnon |
| 7,207,356 B2 | 4/2007 | Patel et al. |
| 7,300,547 B2 | 11/2007 | Luu et al. |
| 7,360,560 B2 | 4/2008 | Barrett et al. |
| 7,395,840 B2 | 7/2008 | Ito |
| 7,473,336 B2 | 1/2009 | Hawes et al. |
| 7,476,294 B2 | 1/2009 | Herman et al. |
| 7,491,297 B2 | 2/2009 | Serr et al. |
| 7,493,923 B2 | 2/2009 | Barrett et al. |
| 7,494,563 B2 | 2/2009 | Edwards et al. |
| 7,513,277 B2 | 4/2009 | Crook et al. |
| 7,524,403 B2 | 4/2009 | Fernandes et al. |
| 7,584,768 B2 | 9/2009 | Westerkamp et al. |
| 7,585,388 B2 | 9/2009 | Yeh et al. |
| 7,585,395 B2 | 9/2009 | Quigley et al. |
| 7,588,660 B2 | 9/2009 | Edwards et al. |
| 7,604,026 B2 | 10/2009 | Herman |
| 7,611,607 B2 | 11/2009 | Mullally et al. |
| 7,644,738 B2 | 1/2010 | Kroll et al. |
| 7,691,228 B2 | 4/2010 | Edwards et al. |
| 7,717,141 B1 | 5/2010 | Quigley |
| 7,721,769 B2 | 5/2010 | Fernandes |
| 7,740,029 B2 | 6/2010 | Hodson et al. |
| 7,743,795 B2 | 6/2010 | Quigley |
| 7,749,925 B2 | 7/2010 | Morton |
| 7,775,243 B2 | 8/2010 | Hack-Ueberall et al. |
| 7,815,768 B2 | 10/2010 | Herman |
| 7,846,296 B2 | 12/2010 | Luu et al. |
| 7,878,223 B2 | 2/2011 | Kroll et al. |
| 7,878,224 B2 | 2/2011 | Quigley |
| 7,879,193 B2 | 2/2011 | Quigley |
| 7,879,194 B2 | 2/2011 | Quigley |
| 7,879,195 B2 | 2/2011 | Quigley |
| 7,887,673 B2 | 2/2011 | Andersson et al. |
| 7,892,402 B2 | 2/2011 | Hawes et al. |
| 7,896,034 B2 | 3/2011 | Harwood et al. |
| 7,918,964 B2 | 4/2011 | Edwards et al. |
| 7,935,220 B2 | 5/2011 | Edwards et al. |
| 7,993,493 B2 | 8/2011 | Quigley |
| 8,002,950 B2 | 8/2011 | Quigley |
| 8,038,847 B2 | 10/2011 | Quigley |
| 8,043,477 B2 | 10/2011 | Crook et al. |
| 8,080,130 B2 | 12/2011 | Harper et al. |
| 8,114,254 B2 | 2/2012 | Quigley |
| 8,141,595 B2 | 3/2012 | Quigley |
| 8,178,025 B2 | 5/2012 | Awofeso et al. |
| 8,202,396 B2 | 6/2012 | Hultcrantz et al. |
| 8,216,427 B2 | 7/2012 | Klerelid et al. |
| 8,251,103 B2 | 8/2012 | Baumann |
| 8,273,218 B2 | 9/2012 | Köockritz |
| 8,312,900 B2 | 11/2012 | Hack-Ueberall et al. |
| 8,328,990 B2 | 12/2012 | Quigley |
| 8,366,878 B2 | 2/2013 | Klerelid et al. |
| 8,371,460 B2 | 2/2013 | Ghatikar et al. |
| 8,372,246 B2 | 2/2013 | Hawes et al. |
| 8,377,262 B2 | 2/2013 | Quigley |
| 8,382,956 B2 | 2/2013 | Boechat et al. |
| 8,388,811 B2 | 3/2013 | Köckritz |
| 8,409,404 B2 | 4/2013 | Harper et al. |
| 8,440,055 B2 | 5/2013 | Scherb et al. |
| 8,444,826 B2 | 5/2013 | Danby et al. |
| 8,444,827 B2 | 5/2013 | Quigley |
| D684,137 S | 6/2013 | Groset et al. |
| 8,480,857 B2 | 7/2013 | Quigley |
| 8,481,133 B2 | 7/2013 | Hermans et al. |
| 8,622,095 B2 | 1/2014 | Quigley |
| 8,652,300 B2 | 2/2014 | Super et al. |
| 8,652,597 B2 | 2/2014 | Hermans et al. |
| 8,657,997 B2 | 2/2014 | Polat et al. |
| 8,702,905 B1 | 4/2014 | Hermans et al. |
| 8,808,506 B2 | 8/2014 | Quigley |
| 8,834,677 B2 | 9/2014 | Tirimacco et al. |
| 8,834,978 B1 | 9/2014 | Hermans et al. |
| 9,062,416 B2 | 6/2015 | Sze |
| 9,279,219 B2 | 3/2016 | Edwards et al. |
| 9,303,363 B2 | 4/2016 | Chou et al. |
| 9,345,375 B2 | 5/2016 | Sumnicht et al. |
| 9,349,175 B2 | 5/2016 | Sze |
| 9,382,663 B2 | 7/2016 | Sze |
| 9,388,534 B2 | 7/2016 | Super et al. |
| 9,404,224 B2 | 8/2016 | Chou et al. |
| 9,443,301 B2 | 9/2016 | Sze |
| 9,574,306 B2 | 2/2017 | Chou et al. |
| 9,594,993 B2 | 3/2017 | Picard et al. |
| 9,611,951 B2 | 4/2017 | Chou et al. |
| 9,915,032 B2 | 3/2018 | Chou et al. |
| 9,920,479 B2 | 3/2018 | Sze |
| 9,920,480 B2 | 3/2018 | Sze |
| 9,957,667 B2 | 5/2018 | Chou et al. |
| 9,963,828 B2 | 5/2018 | Sze |
| 9,963,831 B2 | 5/2018 | Sze et al. |
| 9,988,766 B2 | 6/2018 | Chou et al. |
| 2002/0148584 A1 | 10/2002 | Edwards et al. |
| 2005/0241786 A1 | 11/2005 | Edwards et al. |
| 2005/0260409 A1 | 11/2005 | Payne et al. |
| 2006/0118993 A1 | 6/2006 | Awofeso et al. |
| 2006/0162803 A1 | 7/2006 | Vines |
| 2006/0278294 A1 | 12/2006 | Quigley |

(56) References Cited

U.S. PATENT DOCUMENTS

| | | |
|---|---|---|
| 2007/0107863 A1 | 5/2007 | Edwards et al. |
| 2007/0119513 A1 | 5/2007 | Hodson |
| 2008/0029235 A1 | 2/2008 | Edwards et al. |
| 2008/0169040 A1 | 7/2008 | Barrett |
| 2008/0196784 A1 | 8/2008 | Quigley |
| 2009/0194244 A1 | 8/2009 | Harper et al. |
| 2009/0294079 A1 | 12/2009 | Edwards et al. |
| 2010/0186921 A1 | 7/2010 | Quigley |
| 2010/0186922 A1 | 7/2010 | Quigley |
| 2010/0193149 A1 | 8/2010 | Quigley |
| 2010/0224338 A1 | 9/2010 | Harper et al. |
| 2011/0030909 A1 | 2/2011 | Danby et al. |
| 2011/0088859 A1 | 4/2011 | Hultcrantz et al. |
| 2011/0174456 A1 | 7/2011 | Fernandes et al. |
| 2011/0247776 A1 | 10/2011 | Quigley |
| 2012/0024486 A1 | 2/2012 | Quigley |
| 2012/0024487 A1 | 2/2012 | Quigley |
| 2012/0024489 A1 | 2/2012 | Quigley |
| 2012/0193041 A1 | 8/2012 | Sun |
| 2012/0193051 A1 | 8/2012 | Quigley |
| 2012/0193052 A1 | 8/2012 | Quigley |
| 2012/0193053 A1 | 8/2012 | Quigley |
| 2013/0068868 A1 | 3/2013 | Hermans et al. |
| 2013/0098572 A1 | 4/2013 | Polat et al. |
| 2013/0206347 A1 | 8/2013 | Quigley |
| 2013/0206348 A1 | 8/2013 | Quigley |
| 2014/0103575 A1 | 4/2014 | Awofeso et al. |
| 2014/0130996 A1 | 5/2014 | Sze |
| 2014/0133734 A1 | 5/2014 | Sze |
| 2014/0209264 A1 | 7/2014 | Tirimacco et al. |
| 2014/0254885 A1 | 9/2014 | Sze |
| 2015/0068695 A1 | 3/2015 | Edwards et al. |
| 2015/0129145 A1 | 5/2015 | Chou et al. |
| 2015/0129146 A1 | 5/2015 | Chou et al. |
| 2015/0176215 A1 | 6/2015 | Sumnicht et al. |
| 2015/0204016 A1 | 7/2015 | Sze |
| 2015/0240421 A1 | 8/2015 | Sze |
| 2015/0243011 A1 | 8/2015 | Sze |
| 2016/0097164 A1 | 4/2016 | Chou et al. |
| 2016/0267639 A1 | 9/2016 | Sze |
| 2016/0305072 A1 | 10/2016 | Chou et al. |
| 2016/0355982 A1 | 12/2016 | Sze et al. |
| 2016/0369453 A1 | 12/2016 | Sze |
| 2017/0089013 A1 | 3/2017 | Sze et al. |
| 2017/0121912 A1 | 5/2017 | Chou et al. |
| 2017/0121914 A1 | 5/2017 | Chou et al. |
| 2017/0260696 A1 | 9/2017 | Chou et al. |
| 2018/0274176 A1 | 9/2018 | Chou et al. |

FOREIGN PATENT DOCUMENTS

| | | |
|---|---|---|
| CA | 2928466 A1 | 5/2015 |
| CL | 2016001144 A1 | 5/2017 |
| CN | 103814174 A | 5/2014 |
| EP | 1770210 A1 | 4/2007 |
| EP | 2088237 A1 | 8/2009 |
| JP | 50-25811 A | 3/1975 |
| JP | H03-268936 A | 11/1991 |
| JP | H07-051181 A | 2/1995 |
| JP | H10-506155 A | 6/1998 |
| JP | 11-511518 A | 10/1999 |
| JP | 2002-525455 A | 8/2002 |
| JP | 2002542406 A | 12/2002 |
| JP | 2003-509598 A | 3/2003 |
| JP | 2007-143764 A | 6/2007 |
| JP | 2008-500464 A | 1/2008 |
| JP | 2008-537032 A | 9/2008 |
| JP | 2008-274540 A | 11/2008 |
| JP | 2010503774 A | 2/2010 |
| JP | 2011-506779 A | 3/2011 |
| JP | 2013-108197 A | 6/2013 |
| WO | 96/00811 A1 | 1/1996 |
| WO | 9724488 A1 | 7/1997 |
| WO | 0019014 A1 | 4/2000 |
| WO | 2008/027799 A2 | 3/2008 |
| WO | 2009/150143 A1 | 12/2009 |
| WO | 2010/012561 A1 | 2/2010 |
| WO | 2013/016377 A2 | 1/2013 |
| WO | 2013/041989 A2 | 3/2013 |
| WO | 2015/073863 A2 | 5/2015 |

OTHER PUBLICATIONS

Chinese Official Action dated Apr. 6, 2017, issued in corresponding Chinese Patent Application No. 201480061848.3, with an English translation.

Office Action dated Mar. 11, 2019, issued in corresponding Chilean Patent Application No. 21801197.

Notification of and International Search Report and Written Opinion dated Mar. 16, 2015, in corresponding International Application No. PCT/US2014/065763.

International Preliminary Report on Patentability dated May 17, 2016, in corresponding International Patent Application No. PCT/US2014/065763.

Office Action dated Oct. 23, 2018, issued in corresponding Japanese Patent Application No. 2016-530887.

Office Action dated Dec. 28, 2018, issued in corresponding Chinese Patent Application No. 201710587981.8.

Office Action dated Dec. 2, 2019, issued in corresponding Japanese Patent Application No. 2019-004126.

Office Action dated Mar. 11, 2020, issued in corresponding Chilean Patent Application No. 01613-2019.

Office Action dated Jan. 7, 2020, issued in corresponding Japanese Patent Application No. 2016-530887.

| FABRIC | REF. A | REF. B | REF. C | REF. D |
|---|---|---|---|---|
| Pressure Imprint | | | | |
| Contact Area Ratio (CAR) (mm) | 0.23 | 0.26 | 0.30 | 0.32 |
| Effective Pocket Volume (EPV) (mm³) | 1.28 | 1.20 | 1.00 | 0.83 |
| Planar Volumetric Index = CAR x EPV x 100 | 29.60 | 30.53 | 29.89 | 26.23 |
| CAR (mm²) (non-rectangular, parallelogram unit cell) | 0.21 | 0.23 | 0.27 | 0.29 |
| EPV (mm³) (non-rectangular, parallelogram unit cell) | 1.45 | 0.96 | 1.36 | 1.16 |
| Adjusted planar volumetric index | 29.85 | 31.48 | 31.13 | 27.42 |

FIG. 12A

| FABRIC | COMP. 1 | COMP. 2 | COMP. 3 | COMP. 4 |
|---|---|---|---|---|
| Pressure Imprint | | | | |
| Contact Area Ratio (CAR) (mm) | 0.19 | 0.24 | 0.24 | 0.33 |
| Effective Pocket Volume (EPV) (mm³) | 0.43 | 0.30 | 0.26 | 0.18 |
| Planar Volumetric Index = CAR x EPV x 100 | 8.02 | 7.14 | 6.22 | 6.14 |
| CAR (mm) (non-rectangular, parallelogram unit cell) | 0.19 | 0.24 | 0.24 | 0.31 |
| EPV (mm³) (non-rectangular, parallelogram unit cell) | 0.43 | 0.30 | 0.26 | 0.20 |
| Adjusted planar volumetric index | 8.06 | 7.15 | 6.27 | 6.34 |

FIG. 12B

| FABRIC | COMP. 5 | COMP. 6 | COMP. 7 | COMP. 8 |
|---|---|---|---|---|
| Pressure Imprint | | | | |
| Contact Area Ratio (CAR) (mm) | 0.28 | 0.23 | 0.25 | 0.19 |
| Effective Pocket Volume (EPV) (mm³) | 0.30 | 0.59 | 0.72 | 0.46 |
| Planar Volumetric Index = CAR x EPV x 100 | 8.39 | 13.47 | 18.13 | 8.78 |
| CAR (mm) (non-rectangular, parallelogram unit cell) | 0.28 | 0.22 | 0.24 | 0.17 |
| EPV (mm³) (non-rectangular, parallelogram unit cell) | 0.31 | 0.63 | 0.77 | 0.52 |
| Adjusted planar volumetric index | 8.49 | 13.64 | 18.43 | 8.99 |

FIG. 12C

| FABRIC | COMP. 9 | COMP. 10 |
|---|---|---|
| Pressure Imprint | 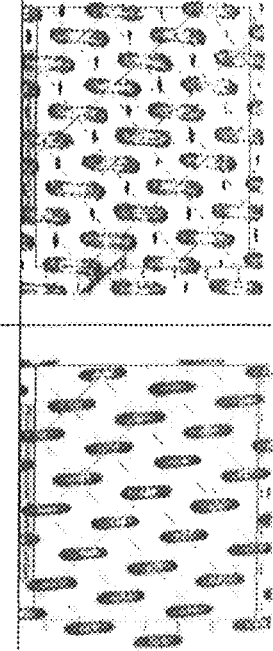 | 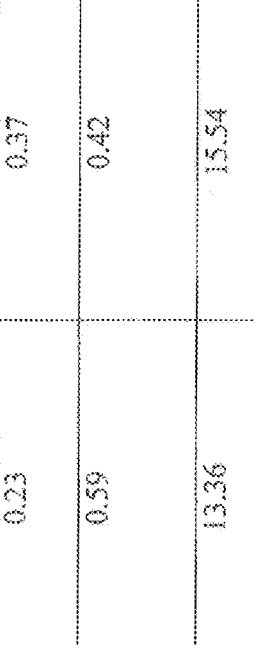 |
| Contact Area Ratio (CAR) (mm) | 0.23 | 0.37 |
| Effective Pocket Volume (EPV) (mm³) | 0.59 | 0.42 |
| Planar Volumetric Index = CAR x EPV x 100 | 13.36 | 15.54 |
| CAR (mm) (non-rectangular, parallelogram unit cell) | 0.23 | 0.36 |
| EPV (mm³) (non-rectangular, parallelogram unit cell) | 0.59 | 0.43 |
| Adjusted planar volumetric index | 13.38 | 15.48 |
FIG. 12D

ABSORBENT SHEETS HAVING HIGH ABSORBENCY AND HIGH CALIPER, AND METHODS OF MAKING SOFT, ABSORBENT SHEETS

CROSS REFERENCE TO RELATED APPLICATIONS

This application is a continuation of U.S. patent application Ser. No. 15/469,618, filed Mar. 27, 2017, now U.S. Pat. No. 9,988,766, which is a divisional application of U.S. patent application Ser. No. 15/404,339, filed Jan. 12, 2017, now, U.S. Pat. No. 9,957,667, which is a divisional application of U.S. patent application Ser. No. 15/191,785, filed Jun. 24, 2016, now U.S. Pat. No. 9,611,591, which is a divisional of U.S. patent application Ser. No. 14/541,380, filed Nov. 14, 2014, now U.S. Pat. No. 9,404,224, which is a non-provisional application based upon U.S. Provisional Patent Application No. 61/904,177, filed on Nov. 14, 2013, which are incorporated herein by reference in their entirety.

FIELD OF THE INVENTION

Our invention relates to paper products such as absorbent hand towels. Our invention also relates to processes of manufacturing paper products such as absorbent hand towels.

RELATED ART

It is desirable for many types of paper products to have diverse properties. For example, absorbent paper products must be able to mop up large amounts of liquid before becoming saturated. As another example, customers greatly prefer that absorbent paper products feel soft to the touch. Absorbency and softness, however, are contradictory properties when it comes to manufacturing paper products. Most techniques for increasing the absorbency of paper products will also have the effect of decreasing the perceived softness of the products. Conversely, most techniques for increasing the softness of paper products will have the effect of decreasing the absorbency of the products. For example, calendering basesheets that make up the paper products can increase the softness of the products. Calendering, however, also has the effect of reducing the caliper of the basesheets. And, as absorbency of paper products is generally proportional to the caliper of the products, calendering the basesheets will also have the effect of reducing the absorbency of the products. The use of wet and dry strength resins are examples of other techniques that improve the properties of paper products. Such resins are added to the furnish used in a papermaking process, and the resins have the effect of improving the underlying strength of the resulting paper products, e.g., the cross machine direction (CD) or machine direction (MD) wet tensile strength of the products. Wet and dry strength resins, however, also have the undesirable effect of reducing the perceived softness of the resulting products.

Another challenge in manufacturing paper products is that paper making is a relatively low margin industry, and, thus, there is a constant need to find more economically efficient products and processing. In terms of products, the basis weight or bulk of paper products are properties that are often studied in an attempt to devise more economical products. There is a constant search for paper products that have a lower basis weight or higher bulk, but still have comparable properties in all other aspects.

SUMMARY OF THE INVENTION

According to one aspect, our invention provides process of determining features of a fabric. The process includes forming a representation of a portion of a surface of the fabric, the representation showing locations and sizes of knuckles and pockets in the surface of the fabric, and the representation being one of a print of the fabric surface and a photograph of the surface of the fabric. The process further includes generating an image of the portion of the surface of the fabric based on the representation, displaying at least a portion of the image on a screen associated with a computer having a processor, determining the sizes and locations of the knuckles in the display of the representation, and determining the sizes and locations of the pockets in the display of the representation. The process still further includes drawing a unit cell for the portion of the surface of the fabric in the displayed image, wherein the unit cell is defined by guidelines that (i) pass through the centers of the knuckles and (ii) form shapes that surround areas of the image that correspond to where the pockets are formed between the knuckles, and calculating a planar volumetric index of the fabric based on properties of the unit cell formed by the guidelines. The outline and guidelines are drawn using an image analysis program stored in a non-transitory computer-readable medium.

According to another aspect, our invention provides a process of determining features of a fabric. The process includes forming a representation of a portion of a surface of the fabric, the representation showing locations and sizes of knuckles and pockets in the surface of the fabric, and the representation being one of a print of the fabric surface and a photograph of the surface of the fabric, generating an image of the portion of the surface of the fabric based on the representation, displaying at least a portion of the image on a screen associated with a computer having a processor, determining the sizes and locations of the knuckles in the display of the representation, and determining the sizes and locations of the pockets in the display of the representation. The process further includes drawing a unit cell for the portion of the surface of the fabric in the displayed image, wherein the unit cell is defined by guidelines that (i) pass through the centers of the knuckles and (ii) form shapes that surround areas of the image that correspond to where the pockets are formed between the knuckles, and calculating an adjusted planar volumetric index of the fabric based on properties of the unit cell formed by the guidelines. The outline and guidelines are drawn using an image analysis program stored in a non-transitory computer-readable medium.

BRIEF DESCRIPTION OF TIE DRAWINGS

FIGS. 12A through 12D show planar volumetric indexes for a structuring fabric that can be used to make the products of the invention and planar volumetric indexes for comparative structuring fabrics.

DETAILED DESCRIPTION OF THE PREFERRED EMBODIMENTS

Figure 1:
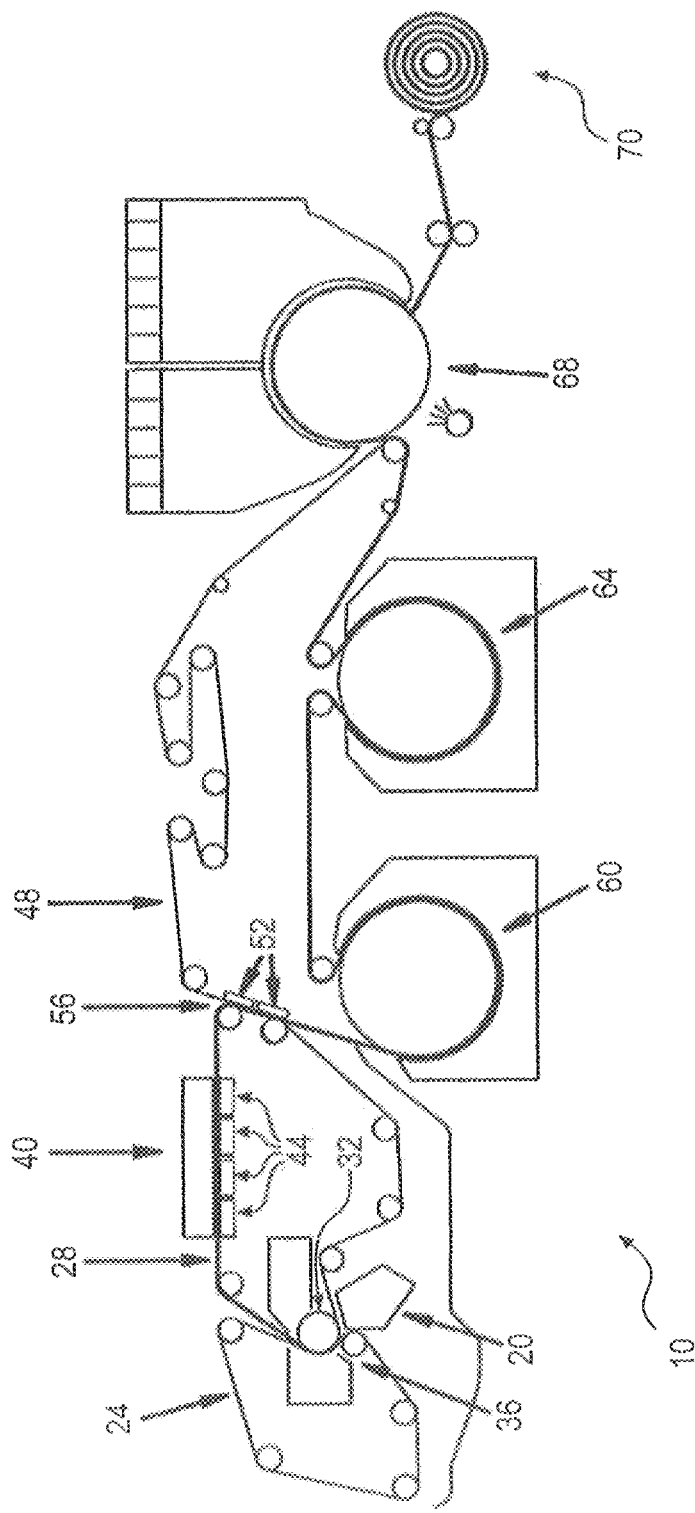
FIG. 1 is a schematic diagram of a papermaking machine configuration that can be used in conjunction with our invention.

Our invention relates to absorbent paper products and methods of making absorbent paper products. The absorbent paper products according to our invention have outstanding combinations of properties that are superior to other paper products that are known in the art. In some specific embodiments, the paper products according to our invention have combinations of properties particularly well suited for absorbent hand towels.

The term "paper product," as used herein, encompasses any product incorporating papermaking fibers having cellulose as a major constituent. This would include, for example, products marketed as paper towels, toilet paper, facial tissues, etc. Papermaking fibers include virgin pulps or recycle (secondary) cellulosic fibers, or fiber mixes comprising cellulosic fibers. Wood fibers include, for example, those obtained from deciduous and coniferous trees, including softwood fibers, such as northern and southern softwood kraft fibers, and hardwood fibers, such as eucalyptus, maple, birch, aspen, or the like. Examples of fibers suitable for making the products of our invention include non-wood fibers, such as cotton fibers or cotton derivatives, abaca, kenaf, sabai grass, flax, esparto grass, straw, jute hemp, bagasse, milkweed floss fibers, and pineapple leaf fibers.

"Furnishes" and like terminology refers to aqueous compositions including papermaking fibers, and, optionally, wet strength resins, debonders, and the like, for making paper products. A variety of furnishes can be used in embodiments of our invention. In some embodiments, furnishes are used according to the specifications described in U.S. Pat. No. 8,080,130 (the disclosure of which is incorporated by reference in its entirety). The furnishes in this patent include, among other things, cellulosic long fibers having a coarseness of at least about 15.5 mg/100 mm. Examples of furnishes are also specified in the product examples discussed herein.

As used herein, the initial fiber and liquid mixture that is dried to a finished product in a papermaking process will be referred to as a "web" and/or a "nascent web." The dried, single-ply product from a papermaking process will be referred to as a "basesheet." Further, the product of a papermaking process may be referred to as an "absorbent sheet." In this regard, an absorbent sheet may be the same as a single basesheet. Alternatively, an absorbent sheet may include a plurality of basesheets, as in a multi-ply structure. Further, an absorbent sheet may have undergone additional processing after being dried in the initial basesheet forming process in order to form a final paper product from a converted basesheet. An "absorbent sheet" includes commercial products marketed as, for example, hand towels.

The term "directly attached" when used in reference to a first ply and a second ply of products means that the two plys are attached to each other without any intermediate ply. The first ply thereby forms a first surface of the sheet, and the second ply thereby forms a second surface of the sheet. In this regard, a "ply" refers to a sheet structure made of papermaking fibers having cellulose as a major constituent, and does not encompass, for example, a glue used to directly attach two plys together. Those skilled in the art will recognize the numerous techniques for directly attaching two or more plys together into a paper product.

When describing our invention herein, the terms "machine direction" (MD) and "cross machine direction" (CD) will be used in accordance with their well-understood meaning in the art. That is, the MD of a fabric or other structure refers to the direction that the structure moves on a papermaking machine in a papermaking process, while CD refers to a direction crossing the MD of the structure. Similarly, when referencing paper products, the MD of the paper product refers to the direction on the product that the product moved on the papermaking machine in the papermaking process, and the CD of the product refers to the direction crossing the MD of the product.

FIG. 1 shows an example of a papermaking machine 10 that can be used to make paper products according to our invention. The papermaking machine 10 is configured for a through air drying (TAD) papermaking process in which a structuring fabric 48 is used to form the three-dimensional structure of the paper product. To begin the process, furnish supplied through a head box 20 is directed in a jet into a nip formed between a forming fabric 24 and a transfer fabric 28. The forming fabric 24 and the transfer fabric 28 pass between a forming roll 32 and a breast roll 36, and then diverge after passing between the forming roll 32 and the breast roll 36. At this point, the furnish has been formed into a nascent web on the transfer fabric 28. The transfer fabric 28 then passes through dewatering zone 40 in which suction boxes 44 remove moisture from the web and the transfer fabric 28, thereby increasing the consistency of the web, for example, from about 10% to about 25% prior to transfer of the web to the structuring fabric 48. In some instances, it will be advantageous to apply a vacuum through vacuum assist boxes 52 in the transfer zone 56, particularly, when a considerable amount of fabric crepe is imparted to the web in the transfer zone 56 by a rush transfer wherein the transfer fabric 28 is moving faster than the structuring fabric 48.

Because the web still has a high moisture content when it is transferred to the structuring fabric 48, the web is deformable such that portions of the web can be drawn into pockets formed between the yarns that make up the structuring fabric 48. (The pockets in structuring fabrics will be described in detail below.) As the structuring fabric 48 passes around through dryers 60 and 64, the consistency of the web is increased, for example, from about 60% to about 90%. The web is thereby more or less permanently imparted with a shape by the structuring fabric 48 that includes domes that are formed where the web is drawn into the pockets of the structuring fabric 48. Thus, the structuring fabric 48 provides a three-dimensional shape to the web that results in a paper product having dome structures.

To complete the paper forming process, the web is transferred from the structuring fabric 48 to a Yankee dryer 68. The transfer can be accomplished without a major degradation of the properties of the web, by contacting the web with adhesive sprayed onto the Yankee driver 68. After the web reaches a consistency of about 96% or greater, a further creping is used to dislodge the web from the Yankee dryer 68, and then, the web is taken up by a reel 70. The speed of the reel 70 can be controlled relative to the speed of the Yankee dryer 68 to adjust the further crepe that is applied to the web as it is removed from the Yankee dryer 68.

The basesheets on reel 70 may then be subjected to further processing, as is known in the art, in order to convert the basesheets into specific products. For example, the basesheets may be embossed, and two basesheets can be combined into multi-ply products. The specifics of such a converting are discussed below in conjunction with the specific trial examples of products according to our invention.

While FIG. 1 demonstrates one type of process in which a structuring fabric is used to impart a three-dimensional shape to a paper product, there are numerous alternative papermaking processes in which a structuring fabric is used. For example, a structuring fabric may be used in a papermaking process that does not utilize through air drying (TAD). An example of such a "non-TAD" process is disclosed in U.S. Pat. No. 7,494,563, the disclosure of which is incorporated by reference in its entirety. As will be appreciated by those skilled in the art, the invention disclosed herein is not necessarily limited to any particular papermaking process.

Figure 2A:
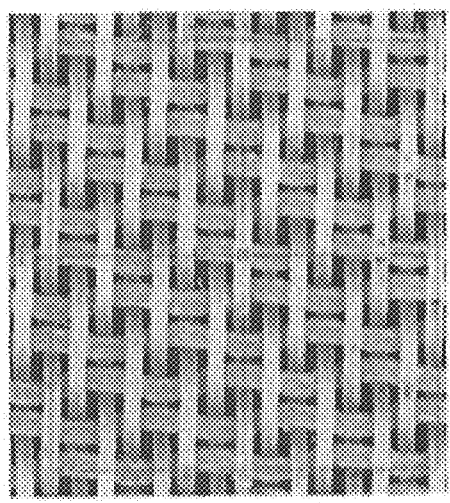
FIGS. 2A and 2B are photographs of the web contacting surfaces of structuring fabrics.
Figure 2B:
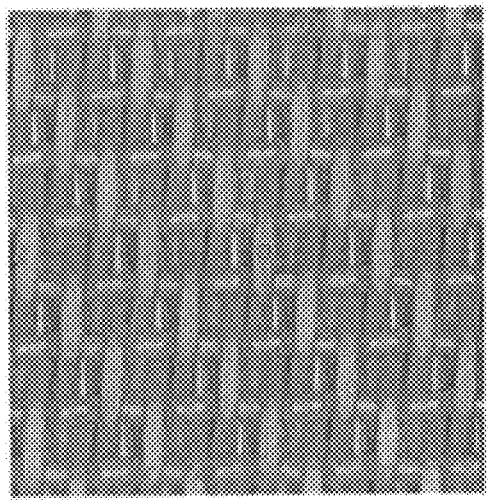

FIGS. 2A and 2B are magnified photographs of structuring fabrics of the type that can be used as the structuring fabric 48 in the papermaking machine 10 shown in FIG. 1. These figures show the surfaces of the fabrics that contact the web in papermaking processes. FIGS. 2A and 2B are conventional structuring fabrics that are well known in the art. The warp and weft threads that make up the body of the structuring fabrics can be seen in FIGS. 2A and 2B.

Figure 3:
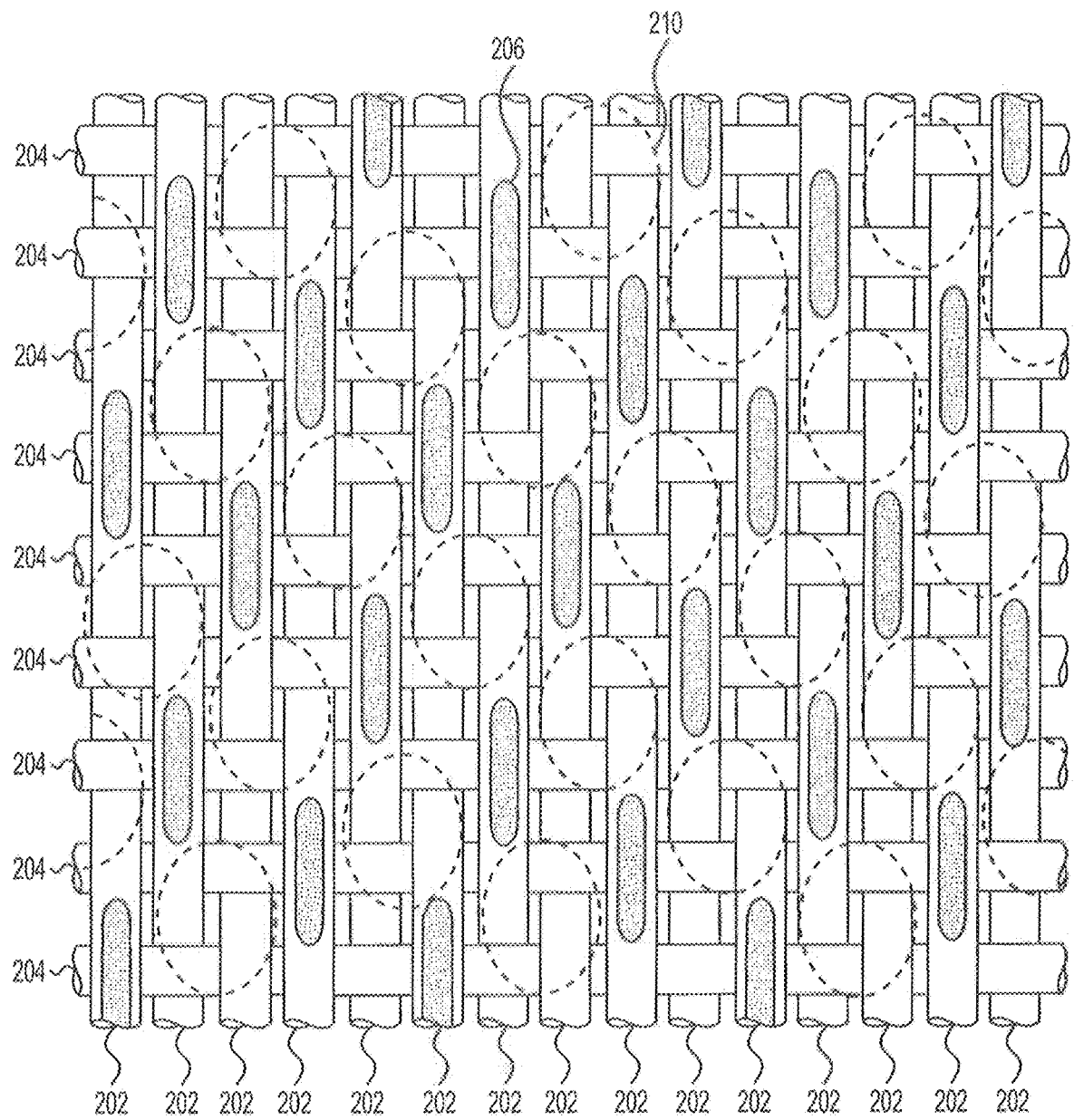
FIG. 3 is a top view of a structuring fabric for making products according to our invention.

FIG. 3 is a detailed drawing of a portion of the web contacting side of the structuring fabric having a configuration for forming products according to our invention. The fabric includes warp yarns 202 that run in the machine direction (MD) when the fabric is used in a papermaking process, and weft yarns 204 that run in the cross machine direction (CD) when the fabric is used in a papermaking process. The warp and weft yarns 202 and 204 are woven together so as to form the body of the fabric. The actual contact surface of the fabric is formed by the knuckles 206, which are formed on the warp yarns 202, but not formed on the weft yarns 204. That is, the knuckles 206 are in a plane that makes up the contact surface of the fabric. Pockets 210 (shown as the outlined areas in FIG. 3) are defined in the areas between the knuckles 206. During a papermaking operation, portions of the web can be drawn into the pockets 210, and it is the portions of the web that are drawn into the pockets 210 that result in dome structures that are present in the resulting paper product, as described above.

As also described above, softness, absorbency, and caliper are three important properties for many types of absorbent paper products. We have found that all three of these properties may be affected by the configuration of the structuring fabric used in the process to form the products. In particular, we have found that the softness, absorbency, and caliper of the absorbent paper products may be influenced by the amount of contact area of the structuring fabric, that is, the area formed by the knuckle surfaces of the structuring fabric that the web contacts in the papermaking process. The softness, absorbency, and caliper of the resulting paper products may also be influenced by the size of the pockets between the knuckles in the structuring fabric. With these findings in mind, we have found that a highly useful manner of characterizing a structuring fabric, such as the fabrics shown in FIGS. 2A, 2B, and 3, is in terms of a "planar volumetric index." The planar volumetric index includes two variables: the contact area ratio (CAR) and the effective pocket volume (EPV). The contact area ratio is defined as the ratio of the contact area formed by the knuckles to the open area in the web contacting side of the structuring fabric. The effective pocket volume is defined as an average volume of the pockets in the structuring fabric into which cellulosic fibers of the web may migrate during the papermaking operation. The planar volumetric index is defined as the contact area ratio (CAR) multiplied by the effective pocket volume (EPV) multiplied by one hundred, i.e., CAR×EPV×100. As will be discussed in further detail below, the structuring fabrics used to form the inventive products and used to practice the inventive methods disclosed herein have a significantly higher planar volumetric index than other fabrics known in the art.

In order to calculate the planar volumetric index for a structuring fabric, the contact area ratio and the effective pocket volume must be measured. Those skilled in the art will recognize that different techniques may be used for measuring the parameters that make up the planar volumetric index of a structuring fabric. Examples of specific techniques that we use for calculating the contact area ratio and the effective pocket volume of structuring fabrics will now be described.

The contact area of a fabric may be measured by the technique described below. Further details of the following technique, which is also described in U.S. Patent Application Publication No. 2014/0133734, now U.S. Pat. No. 9,349,175, U.S. Patent Application Publication No. 2014/0130996, now U.S. Pat. No. 9,062,416, and U.S. Patent Application Publication No. 2014/0254885, now U.S. Pat. No. 9,382,663 (the disclosures of which are incorporated by reference in their entirety), will be described below.

Figure 4:
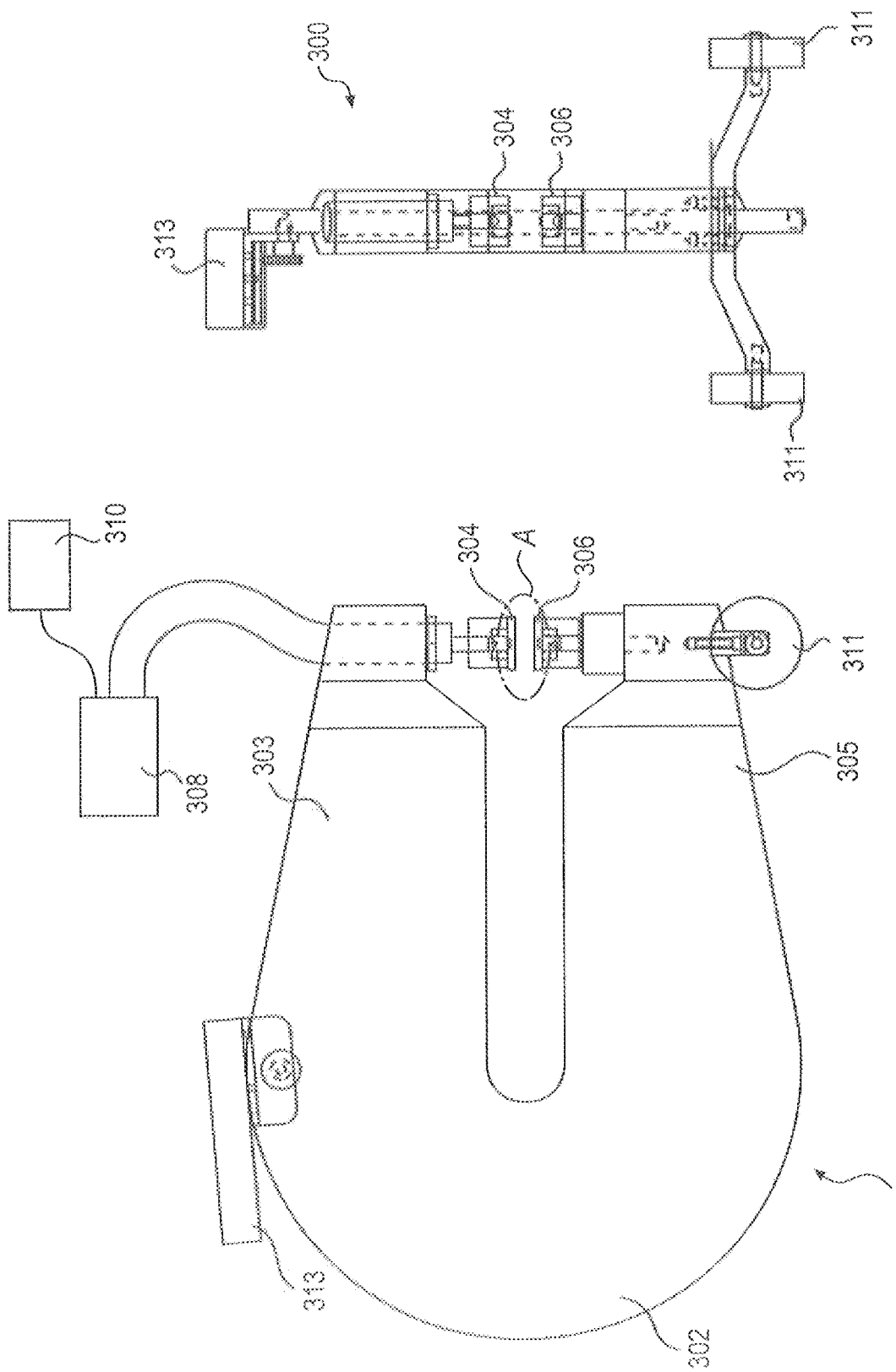
FIGS. 4A and 4B are views of a contact surface printing apparatus.

The contact area ratio measurement begins with forming a representation of the knuckles and pockets of the web contacting side of the structuring fabric. One type of representation is a print of the structuring fabric. In this regard, an apparatus and a technique for forming a print of the contact surface formed by the knuckles of a fabric is shown in FIGS. 4A and 4B. FIG. 4A is a side view of a contact surface printing apparatus 300, and FIG. 4B is a front view of the contact surface printing apparatus 300. This printing apparatus 300 includes a C-shaped frame 302 with first and second arms 303 and 305. A first plate 304 is movably supported by the first arm 303, and a stationary second plate 306 is supported by the second arm 305. A print of the knuckles of a fabric is formed between the first and second plates 304 and 306, as will be described in detail below.

The first plate 304 is operatively connected to a hand-operated hydraulic pump 308 for actuating movement of the first plate 304 towards the second plate 306. The pump 308 has a release valve for allowing the first plate 304 to be retracted from the second plate 306. The pump 308, however, can take many other forms so as to effect movement of the first plate 304. The pump 308 may be connected to a transducer and transducer indicator 310 for measuring the pressure applied by the pump 308 to the first plate 304 as the first plate 304 is pressed against the second plate 306. As a specific example, an ENERPAC® Hydraulic Hand Pump Model CST-18381 by Auctuant Corp. of Milwaukee, Wis., can be used. As a specific example of the pressure transducer, a Transducer Techniques Load Cell Model DSM-5K with a corresponding indicator, made by Transducer Techniques, Inc., of Temecula, Calif., can be used. Of course, in other embodiments, the pump 308, the pressure transducer, and the transducer indicator 310 may be combined into a single unit.

The frame 302 of the contact surface printing apparatus 300 includes wheels 311 adjacent to the front end of the frame 302, as well as a mount 313 that may be used to hold the pump 308 and/or transducer indicator 310. One or more wheels 311 provided to the frame 302 make the frame 302 easier to move. An advantageous feature of the contact surface printing apparatus 300, according to embodiments of the invention, is its portability. For example, with a configuration as shown in FIGS. 4A and 41B, the printing apparatus 300 may be easily moved about sections of a fabric that are mounted on a papermaking machine. As will certainly become appreciated by those skilled in the art, the ability to form prints of the contact surface of a fabric while the fabric is mounted to a papermaking machine, and, thus, to characterize the fabric according to the techniques described below, provides numerous benefits. As but one example, the wearing of a fabric on a papermaking machine can easily be monitored by using the contact surface printing apparatus 300 to take prints of the knuckles of the fabric after different periods of operation of the papermaking machine.

While the contact surface printing apparatus 300 shown in FIGS. 4A and 4B includes a frame structure 302 that connects the first and second plates 304 and 306, in other embodiments, a contact surface printing apparatus 300 need not include such a single frame structure 302. Instead, the first and second plates 304 and 306 may be non-connected structures that are individually aligned to form the print of a fabric. In still other embodiments, the plates 304 and 306 may take vastly different forms from those depicted in FIGS. 4A and 4B. For example, one of the plates 304 and 306 could be formed as an extended surface, while the other plate is formed as a circular structure that is rolled across the extended surface. The term "plate." as used herein, is a broad term that encompasses any structure sufficient for contacting and/or supporting the components for making the print of the fabric. Additionally, as is clear from the description above, the relative motion of the first and second plates 304 and 306 in any embodiment could be reversed, such that the second plate 306 is made movable, while the first plate 304 is held stationary.

Figure 5:
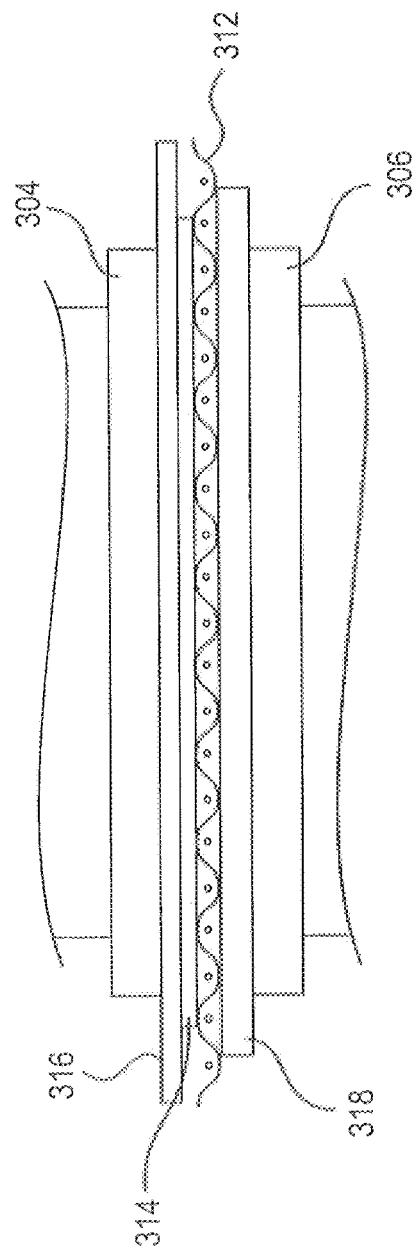
FIG. 5 is a detailed view of the pressing section of the contact surface printing apparatus shown in FIGS. 4A and 4B.
Figure 6A:
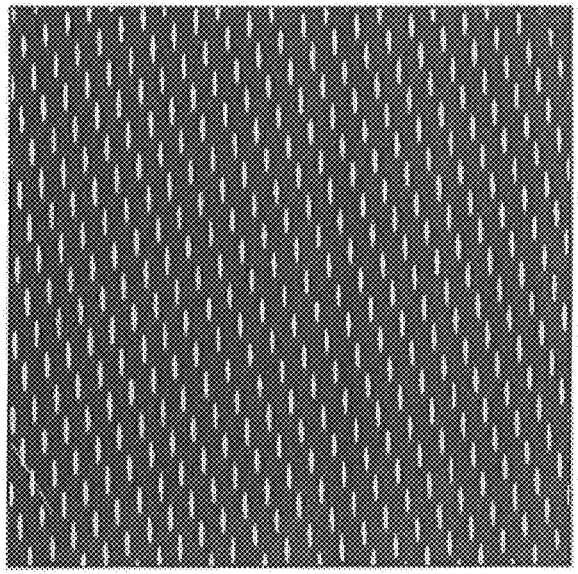
FIGS. 6A through 6D are examples of prints of structuring fabrics.
Figure 6B:
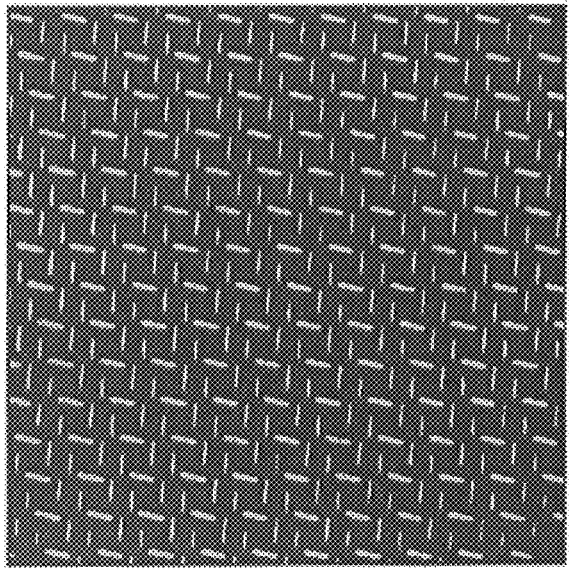
Figure 6C:
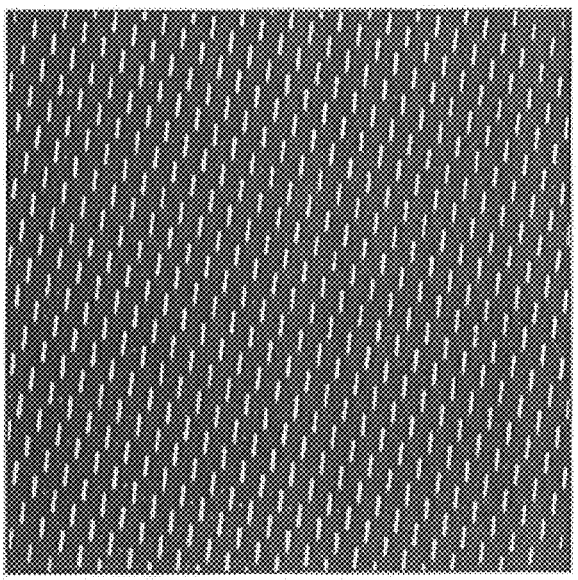
Figure 6D:
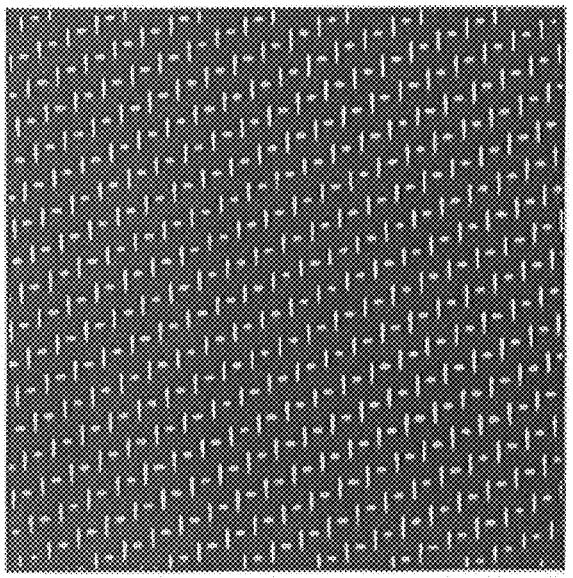

FIG. 5 is a detailed view of Section A of the contact surface printing apparatus 300 shown in FIG. 4A, with the printing apparatus 300 being set up to make a print of a section of a structuring fabric 312. The structuring fabric 312 is positioned between the plates 304 and 306, and a strip of pressure measurement film 314 is positioned against the structuring fabric 312. Between the pressure measurement film 314 and the first plate 304 is one or more sheets of paper 316. Between the structuring fabric 31 and the second plate 306 is a strip of rubber 318.

Pressure measurement film is a material that is structured such that the application of force upon the film causes microcapsules in the film to rupture, producing an instantaneous and permanent, high-resolution image in the contacted area of the film. An example of such a pressure measurement film is sold as Prescale film by Fujifilm Holdings Corporation of Tokyo, Japan. Another example of pressure measurement film is Pressurex-micro® by Sensor Products, Inc., of Madison, N.J. Those skilled in the art will recognize that other types of pressure measurement films could be used in the printing techniques described herein. In this regard, it should be noted that for the analysis techniques described below, the pressure measurement film need not provide an indication of the actual pressure applied by the fabric to the film. Instead, the pressure measurement film need only provide a print image showing the contact surface formed by the knuckles of a fabric.

The pressure applied to first plate 304 when forming a print of fabric 312 on pressure measurement film 314 can be selected so as to simulate the pressure that would be applied to a web against the fabric 312 in an actual papermaking process. That is, the pump 308 may be used to generate a pressure (as measured by the transducer) on the first plate 304 that simulates the pressure that would be applied to a web against the fabric 312 in a papermaking process. In the papermaking process described above in conjunction with FIG. 1, the simulated pressure would be the pressure that is applied to the web against the fabric 48 to the Yankee dryer 68. In some papermaking processes, such as the aforementioned U.S. Pat. No. 7,494,563, the pressure applied to the web against the fabric 48 is generally in the range of six hundred psi. Accordingly, to simulate this papermaking process, six hundred psi of pressure would be applied by the hydraulic pump 308 to the first plate 304 when forming the image of the knuckles of fabric 312 in the pressure measurement film 314. For such an operation, it has been found that medium pressure 10-50 MPa Presclace film by FujiFilm can provide a good image of the knuckles of a structuring fabric.

Referring again to FIG. 5, the paper 316 acts as a cushion to improve the print of the fabric 312 formed on the pressure measurement film 314. That is, the paper 316 provides compressibility and a smooth surface, such that the knuckles of the fabric 312 may "sink" into the pressure measurement film 314, which, in turn, forms a high resolution image of the knuckles in the pressure measurement film 314. To provide these properties, construction and kraft are examples of types of paper that can be used for the film 314.

The strip of rubber 318 creates a level contact surface for supporting the fabric 312. In embodiments of the invention, the plates 304 and 306 are made of a metallic material, such as steel. A steel plate most likely has imperfections that reduce the quality of the print of the knuckles of the fabric 312 formed in the pressure measurement paper 316. The paper 316 and the rubber 318 that are used between the plates 304 and 306, and the pressure measurement film 314 and the fabric 312, however, provide a more level contact surface than do the surfaces of the metallic plates 304 and 306, thereby resulting in better images being formed in the pressure measurement film 314. Those skilled in the art will recognize that other alternative materials to the paper 316 and rubber 318 may be used as structures to provide the level surfaces between the plates 304 and 306 of the printing apparatus 300.

In other embodiments, a print is made of the knuckles of a fabric in materials other than pressure measurement film. Another example of a material that can be used to form prints of a fabric is wax paper. A print of the contact surface of a fabric may be made in a wax surface by pressing the contact surface of the fabric against the wax paper. The print in the wax paper can be made using the plates 304 and 306 in the print apparatus 300 described above, or with other configurations of the plates. The wax paper print can then be analyzed in the same manner as a pressure measurement film print, as will be described below.

FIGS. 6A through 6D show examples of prints of knuckles formed in pressure measurement film using the contact surface printing apparatus 300. In these prints, the distinctive shapes and patterns of the knuckles of the fabrics can be seen. As discussed above, the knuckles form the contact surface for the fabric. Hence, high resolution prints of the knuckles in a pressure measurement film, such as those shown in FIGS. 6A through 6D, provide an excellent representation of the contact surface of a fabric.

Next, a system for analyzing the prints of knuckles, such as those shown in FIGS. 6A through 6D, will be described. In the system, graphical analysis will be conducted on a conventional computer system. Such a computer system will include well-known components, such as at least one computer processor (e.g., a central processing unit or a multiple processing unit) that is connected to a communication infrastructure (e.g., a communications bus, a cross-over bar device, or a network). A further component of the computer system is a display interface (or other output interface) that forwards video graphics, text, etc., for display on a display screen. The computer system may still further include such common components as a keyboard, a mouse device, a main memory, a hard disk drive, a removable-storage drive, a network interface, etc.

As a first step in the analysis, a print of the contact area of the knuckles of a fabric is converted to a computer readable image using a photoscanner. Any type of photoscanner may be used to generate the computer readable image; however, a photoscanner having at least 2400 dots per inch (dpi) has been found to provide a good image for analysis. With the resolution of the scan of the image, an imaging analysis program can apply an exact scale to the image, and the exact scaling will be used in the calculation of the surface characteristics of the structuring fabric (as will be described below).

The scanned image may be stored in a non-transitory computer-readable medium in order to facilitate the analysis described below. A non-transitory computer readable medium, as used herein, comprises all computer-readable media except for a transitory, propagating signal. Examples of non-transitory computer readable media include, for example, a hard disk drive and/or a removable storage drive, representing a disk drive, a magnetic tape drive, an optical disk drive, etc.

The scanned image, as well as characteristics of the contact surface scanned image that are determined according to the techniques described below, may be associated with a database, A "database," as used herein, means a collection of data organized in such a way that a computer program may quickly select desired pieces of the data that constitute the database. An example is an electronic filing system. In some implementations, the term "database" may be used as shorthand for a "database management system."

In order to perform quantitative analysis of the scanned print image, an image analysis program is used with the scanned images of the knuckles of a fabric. Such an image analysis program is developed, for example, with computational software that works with graphical images. One example of such computational development software is MATHEMATICA® by Wolfram Research, Inc., of Champaign, Ill. As will be described below, the image analysis program will be used to specifically identify the knuckles in the fabric print image of the structuring fabric, and, with known scaling of the fabric print image, the image analysis program can calculate the sizes of the knuckles and estimate sizes of the pockets.

When analyzing the scanned image, any size area that includes a plurality of knuckles and a pocket could be used for the analysis described below. In specific embodiments, it has been found that a 1.25 inch by 1.25 inch area of an image of a fabric allows for a good estimation of properties, such as pocket sizes using the techniques described herein. In particular, it has been found that when an image is formed with a 2400 dpi resolution (discussed above), and using a 1.25 inch by 1.25 inch area of image for the analysis, a good characterization of the contact surface can be conducted. Of course, other resolutions and/or area may also provide good results.

Figure 7A:
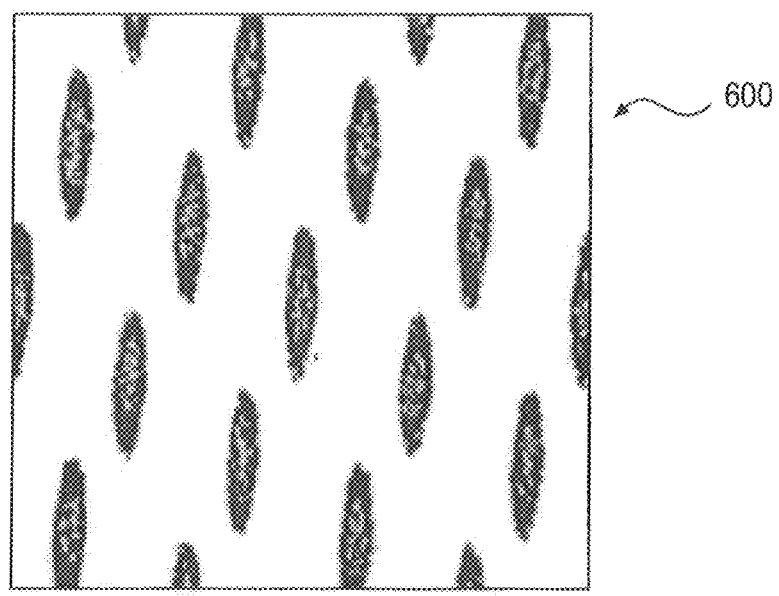
FIGS. 7A through 7E show the steps of establishing a coordinate system in a print of a structuring fabric.

FIGS. 7A through 7E depict the steps of identifying the knuckles in a magnified portion of the scanned image of a print using the image analysis program. Initially, as shown in FIG. 7A, a magnified portion of an image 600 is viewed on the display screen of the computer system running the analysis program. The image 600, which may be formed using the print technique described above, shows the knuckles 602. Along with using the image 600 with the analysis program, the scaling of the image 600 can be input into an analysis program. Such a scaling may be input, for example, as 2400 dpi, from which the analysis program can apply the scale SC to the image 600. The analysis program will then use the scale to calculate the sizes and positions of the knuckles, as described below.

Figure 7B:
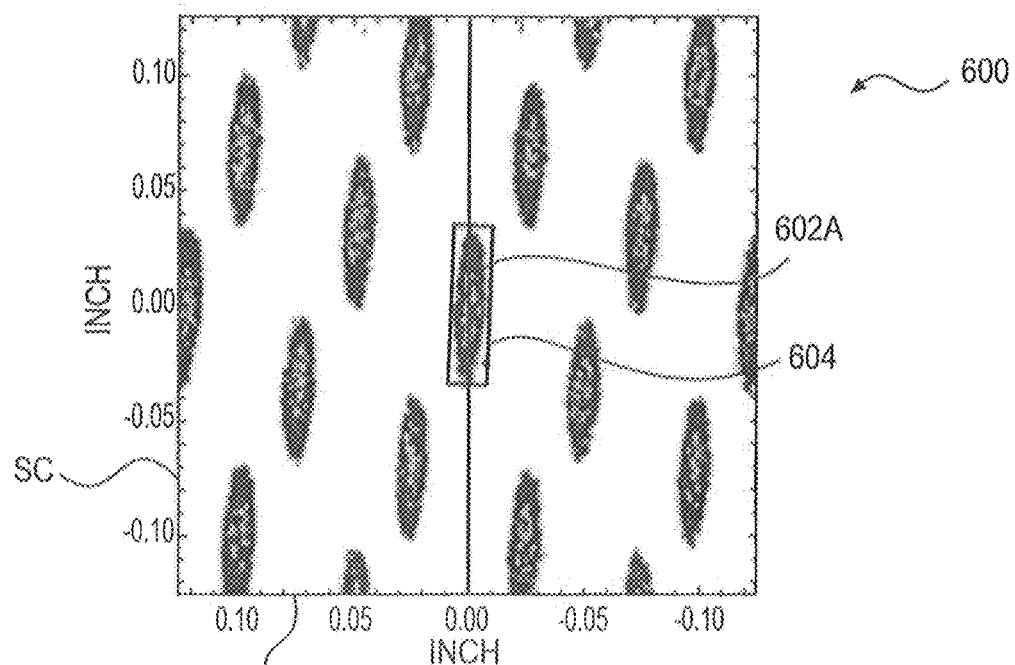
Figure 7C:
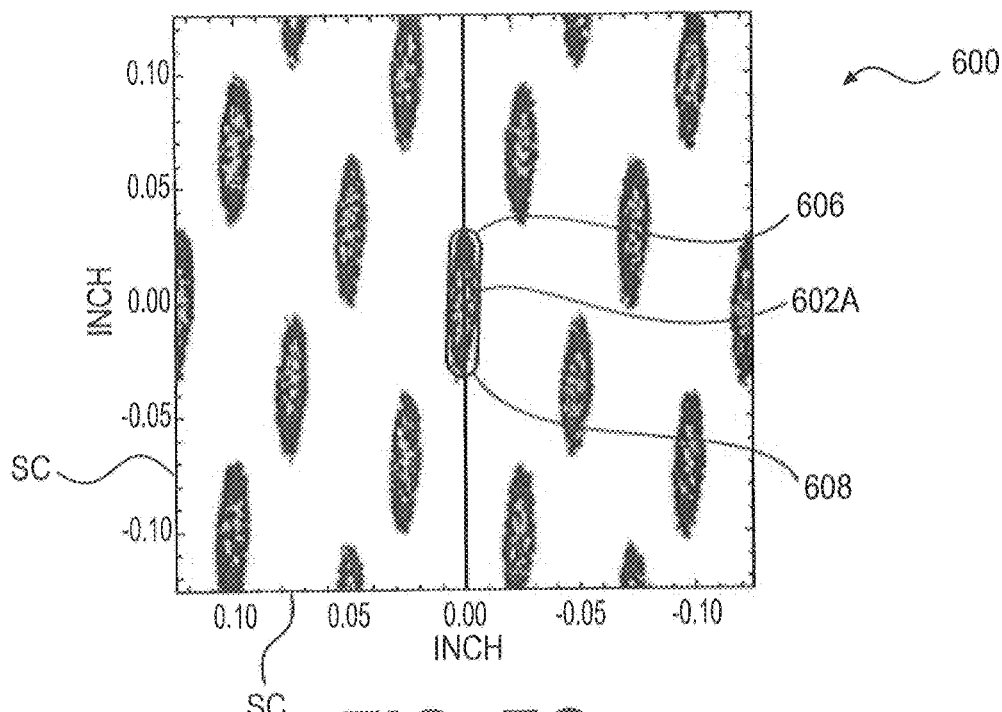

FIGS. 7B and 7C show steps for identifying a specific knuckle 602A using the analysis program. The knuckle 602A is initially selected based on its location at a center region of the magnified image 600. In this step, a rough outline of the knuckle 602A is applied. The rectangular box 604, which may be a stored shape in the analysis program, is initially applied around the knuckle 602A in order to initiate the knuckle identification process. The initial rectangular box 604 shape may then be more closely refined to match the shape of the knuckle 602A, as shown in FIG. 7C. In this case, the ends 606 and 608 are reshaped to be more rounded, and, thus, they more closely correspond to the ends of the knuckle 602A. Although not shown, further refinements could be made to the outline of the knuckle 602A until a sufficient match is made. Such refinements might be conducted by further magnifying the image 600.

Figure 7D:
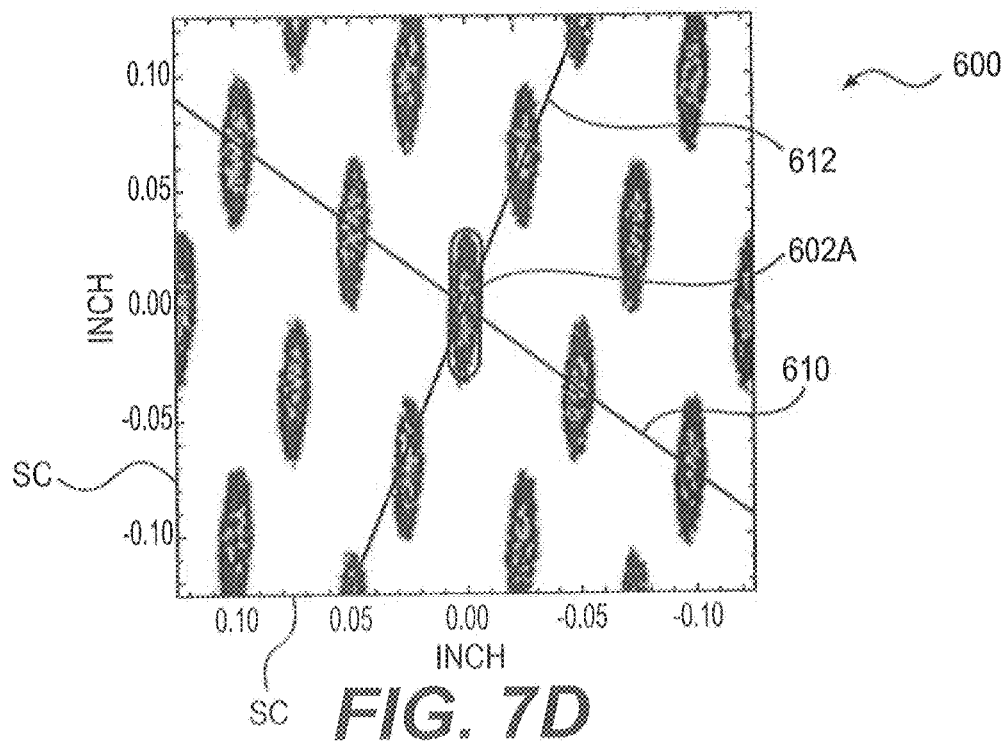

As shown in FIG. 7D, after the knuckle 602A is identified by the outline, guidelines 610 and 612 are drawn. The guidelines 610 and 612 are each drawn so as to pass through the center of the knuckle 602A and extend in straight lines through the centers of the other knuckles. Notably, the guidelines 610 and 612 are also drawn to not cross the areas where pockets are formed in the fabric, which are known to correspond to the areas between groups of knuckles. By drawing the guidelines 610 and 612 straight between the centers of the knuckles, the guidelines 610 and 612 do not cross the area of the pockets that are formed between the knuckles.

Figure 7E:
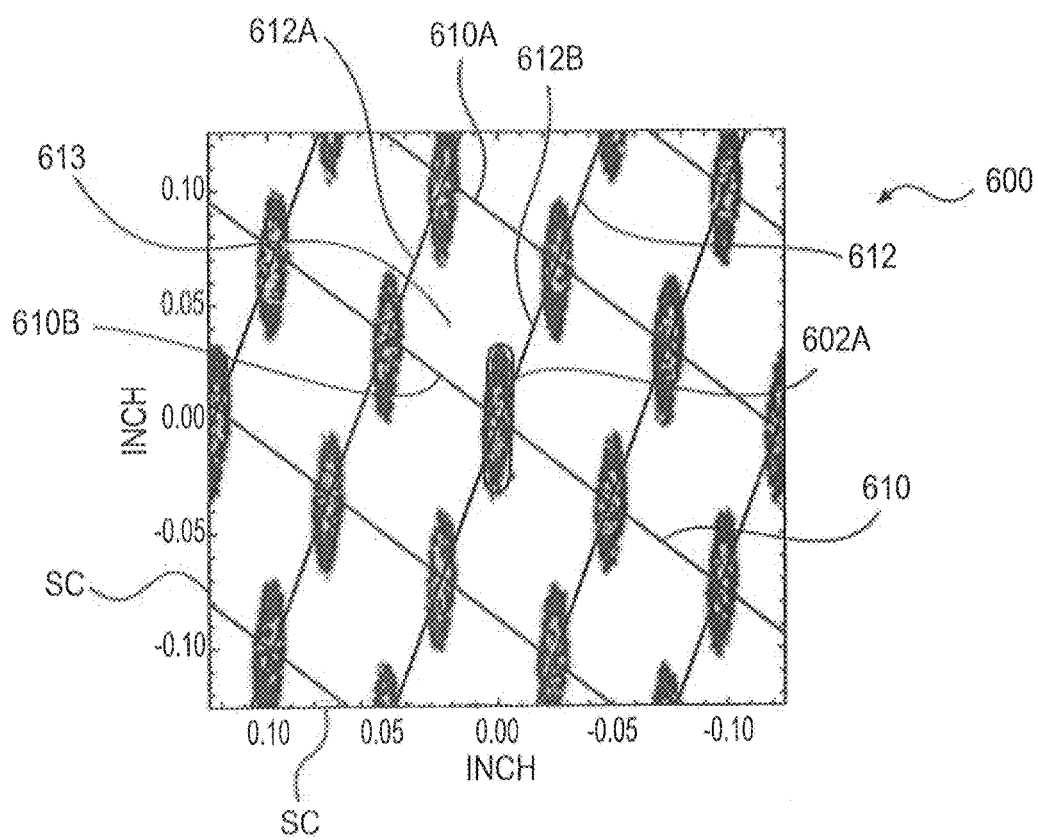

After the guidelines 610 and 612 are drawn, as shown in FIG. 7E, further guidelines are drawn. These guidelines are drawn in a similar manner to guidelines 610 and 612, i.e., through the centers of the knuckles and not passing through areas where pockets are formed. To aid in the process of drawing the guidelines, a lower magnification may be used. With the guidelines, a coordinate system is, in effect, established for the positions of the knuckles. The analysis program, therefore, can now identify the size and shape of the knuckles based on the outline, and can identify the locations of the knuckles as determined by the points where the guidelines cross. The analysis program further has the scale SC of the image 600 input. It follows that the analysis program can apply the scale to the outline knuckle 602A and the knuckle positioning, to calculate the actual sizes and spacing of the knuckles. Note, as well, that the analysis program may calculate the frequency of the guidelines such as the number of times that the guidelines 612 cross guideline 610 per a unit length. The frequency of each set of guidelines 610 and 612 will be used in calculations of properties of the fabric, and in other aspects of the invention, as will be described below.

It should be noted that, as shown in FIGS. 7D and 7E, the knuckles are all about the same size and all about the same shape, and the knuckles are regularly spaced along the guidelines. This is not surprising, inasmuch as most fabrics for papermaking machines are manufactured with highly consistent yarn patterns, which results in very consistent knuckle sizes and positions. The consistency in size, shape, and placement of the knuckles allows for accurate estimates of the size and shapes of all the knuckles on the contact surface of a fabric based on a single selected knuckle, or on a limited number of identified knuckles, and a close estimate of the sizes and locations of the knuckles can be achieved without identifying each knuckle. Of course, to achieve even further accuracy, more than one knuckle could be identified, and the outlines and guidelines could be drawn at different portions of an image.

As shown in FIG. 7E, the guidelines 610 and 612 define a plurality of unit cells. A particular unit cell 613 is shown between guideline segments 610A, 610B, 612A, and 612B. The unit cell 613, in effect, demonstrates the minimum repeating pattern in the fabric, and the maximum allowable pocket size. It should be noted that, while the fabric shown in FIGS. 7A through 7E has about one warp knuckle per unit cell, other fabrics may have more than one warp knuckle and/or more than one weft knuckle per unit cell. In other words, the unit cells defined by the knuckle patterns will vary with different fabric patterns.

As will be readily apparent to those skilled in the art, any or all of the steps shown in FIGS. 7A through 7E can either be performed by a user on a display screen, or alternatively, may be automated so as to be performed upon execution of the analysis program. That is, the analysis program may be configured to automatically identify knuckles as the darkened regions of images, outline the knuckles, and then draw the guidelines based on the identified knuckles in the manner described above.

After the selected knuckle has been identified, and after the guidelines established through the knuckles, multiple properties of the fabric may be calculated using knuckle sizes and positions determined by the analysis program. To perform such calculations, the knuckle size and positioning data can be exported from the analysis program to a conventional spreadsheet program to calculate the properties of the fabric. Examples of the determinations made by the analysis program and the calculations that follow from such determinations are shown in TABLE 1.

TABLE 1

| Characteristic of the Fabric | Determination/Calculation |
|---|---|
| Knuckle Length (KL) | determined based on outline of identified warp knuckle or identified weft knuckle |
| Knuckle Width (KW) | determined based on outline of identified warp knuckle or identied weft knuckle |
| Frequency of Guidelines (f) | determined based on guidelines drawn through knuckles<br>freq 1 = frequency of one set of parallel lines (per inch or cm)<br>freq 2 = frequency of another set of parallel lines (per inch or cm) |
| Rounding Radius (r) | determined based on outline of identified warp knuckle and/or identified weft knuckle, the rounding radius is the level of rounding that is application to the corners of rectangular objects |
| Knuckle Density Per Unit Cell (KDUC) (knuckles per unit cell) | determined based on the number of warp or weft knuckles identified within a cell |
| Unit Cell Knuckle Area (UKA) | warp UKA = warp KW × warp LW − ((2 × warp r)$^2$ − π(warp r)$^2$)<br>weft UKA = weft KW × weft LW − ((2 × weft r)$^2$ − π(weft r)$^2$) |
| Knuckle Density (KD) | F = freq 1 × freq 2<br>warp KD = F × warp KDUC<br>weft KD = F × weft KDUC |
| Total Warp or Weft Knuckle Contact Area (%) | warp area % = warp KD × warp UKA<br>weft area % = weft KD × warp UKA |
| Contact Area Ratio (Total % In-Plane Knuckle Contact Area) | TKCA = warp area % + weft area % |
| % Area Contribution (AC) | % warp AC = [warp UKA/(warp UKA + weft UKA)] × 100<br>% weft AC = [weft UKA/(warp UKA + weft UKA)] × 100 |
| Pocket Area Estimate (PA) | PA = (1/(freq 1 × freq 2)) − (warp UKA × warp KDUC) − (weft UKA × weft KDUC) |
| Pocket Density (PD) (pockets per square inch or centimeter) | PD = freq 1 × freq 2 |

The fabric from which image 600 was obtained only included knuckles 602 on the warp threads. Other fabrics, however, may include knuckles on the weft threads, such as the fabrics that formed the prints in FIGS. 6B and 6D). With such fabrics, the knuckles on the weft threads can be identified using the outlining technique described above, and the guidelines can be drawn through the weft knuckles using the technique described above.

While the contact surface of a fabric may be characterized by using a print of the knuckles of the fabric that is formed, for example, by the contact surface printing apparatus 300, in other embodiments, an image of the contact surface of the fabric may be obtained in a different manner. An alternative to forming a print of the knuckles of the fabric is to photograph the knuckles of a fabric, and then use the above-described procedures and techniques for analyzing an image formed from the photograph. In this regard, a photograph with 2400 dpi has been found to provide sufficiently high and low resolution so as to be analyzed by the techniques described herein.

Figure 8A:
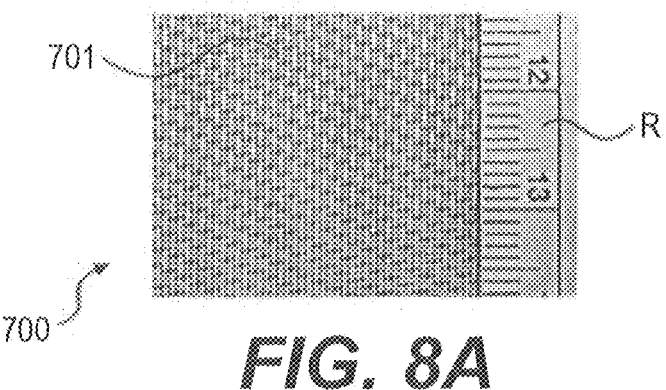
FIGS. 8A through 8C show the application of our analytic technique herein as it is applied to a photograph of the knuckles of a structuring fabric.
Figure 8B:
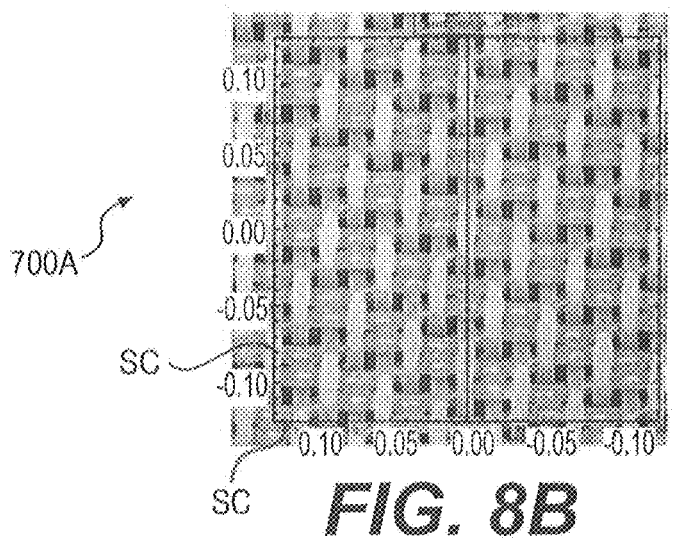
Figure 8C:
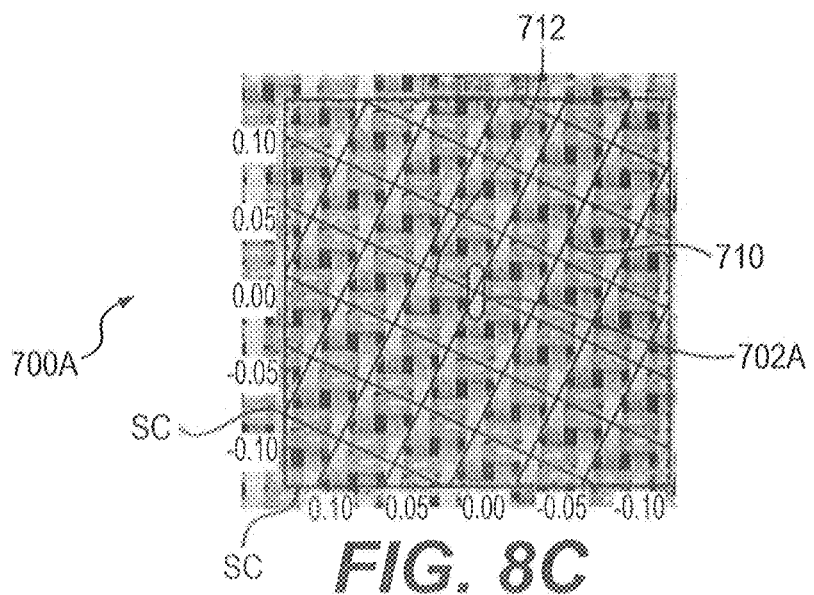
Figure 9A:
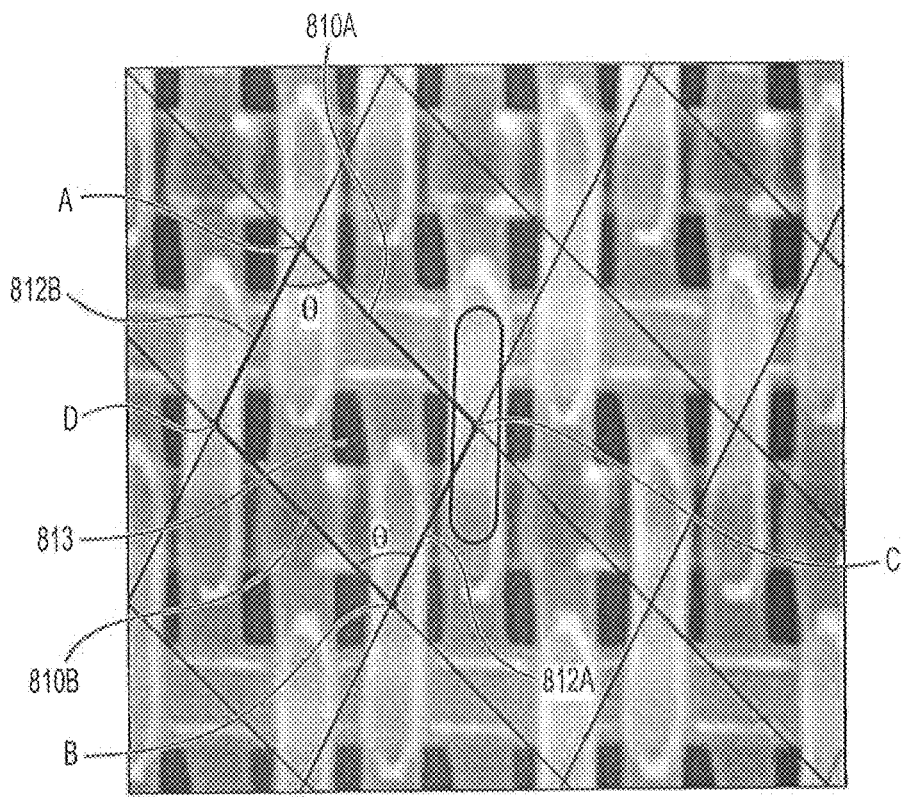
FIGS. 9A and 9B show an alternative analytic technique applied to a photograph and print of the knuckles of a structuring fabric.
Figure 9B:
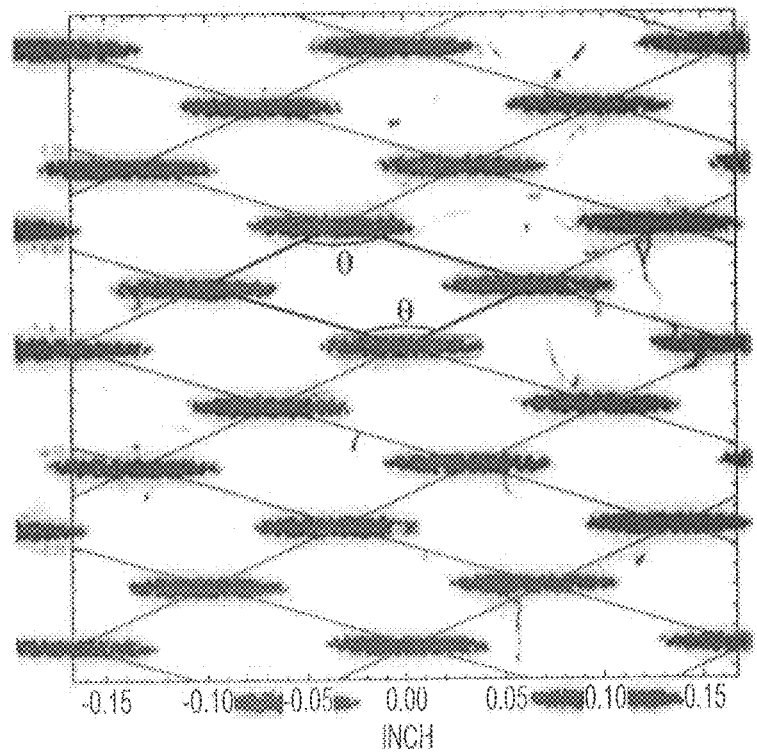

An example of a photograph 700 of the portion of a papermaking fabric with knuckles is shown in FIG. 8A, and the application of the analytic above-described technique to the image generated from photograph 700 are shown in FIGS. 8B and 8C. The photograph 700 in FIG. 8A shows the fabric 701 next to a ruler R. When the photograph 700 is converted to an image for use with the analysis program, the scale for the image 700A can be input based on the photographed ruler R. That is, ruler R in the photograph 700 provides an input from which the analysis can apply a scale to the image. The displayed image 700A, along with the scale SC, is shown in FIG. 8B.

To identify the sizes and locations of knuckles in an image obtained from a photograph of the fabric, the same techniques described above using an image from a print of the fabric, may be used with the photograph. For example, an outlined knuckle 702A and guidelines 710 and 712 are shown on the image 700A in FIG. 8C. With the knuckle sizing and location data from the analysis program, all of the above-described calculations may be carried out to characterize the contact surface of the fabric that was photographed.

The above-described techniques provide a good estimate of the properties of a fabric, particularly when the shapes of the unit cells formed by the guideline segments are substantially rectangular. In-cases, however, when the shapes of the unit cells formed by the guidelines are non-rectangular, parallelograms, an alternative technique may be used to provide more accurate estimates of the properties of the fabrics. An example of this alternative technique is shown in FIG. 8A, which is an image generated from a photograph of the surface of a fabric using the above described image analysis program. In this figure, a unit cell 813 is defined by the guideline segments 810A, 810B, 812A, and 812B. The unit cell 813 formed by the guideline segments 810A, 810B, 812A, and 812B is a substantially non-rectangular, parallelogram shape. In this parallelogram, an angle θ is defined at the corner A where guideline segments 810A and 812B intersect, and the angle θ is also defined at the corner B where the guideline segments 810B and 812A intersect. This angle θ can be readily determined using the image analysis program based on the difference in orientation angles of the guidelines. Further, the image analysis program can also determine the distance between the guideline segments 810A and 810B ("DIST 1") and the distance between guideline segments 812A and 812B ("DIST 2") based on the scale of the image in the manner generally described above. Having determined the intersecting angle θ, the DIST 1, and the DIST 2, the area of the unit cell (UCA) can be calculated using either of the Formula (1) or Formula (2):

$$UCA = (DIST\ 1/\sin\theta) \times DIST\ 2 \qquad (1)$$

$$UCA = (DIST\ 2/\sin\theta) \times DIST\ 1 \qquad (2)$$

Formulas (1) and (2) are derived from the standard formula for calculating the area of a parallelogram, namely Area=base length×height, where DIST 1 or DIST 2 is used as the height of the parallelogram, and then base length is calculated from the sine of the angle θ and the other of DIST 1 or DIST 2.

Table 2 shows examples of determinations made by the analysis program and the calculations that follow from such determinations when using the alternative technique based on a non-rectangular, parallelogram unit cell area calculation.

TABLE 2

| Characteristic of the Fabric | Determination/Calculation |
| --- | --- |
| Knuckle Length (KL) | determined based on outline of identified warp knuckle or identified weft knuckle |
| Knuckle Width (KW) | determined based on outline of identified warp knuckle or identified weft knuckle |
| Frequency of Guidelines (f) | determined based on guidelines drawn through knuckles<br>freq 1 = frequency of the first set of parallel lines (per inch or cm)<br>freq 2 = frequency of the second set of parallel lines (per inch or cm) |
| Intersecting Angle of the Guidelines (θ) | determined based on guidelines drawn through knuckles<br>θ1 = orientation angle of the first set of parallel lines (degree)<br>θ2 = orientation angle of the second set of parallel lines (degree)<br>θ = Abs (θ1 − θ2): intersecting angle between the two sets of guidelines |
| Rounding Radius (r) | determined based on outline of identified warp knuckle and/or identified weft knuckle, the rounding radius is the level of rounding that is application to the corners of rectangular objects |
| Knuckle Density Per Unit Cell (KDUC) (knuckles per unit cell) | determined based on the number of warp or weft knuckles identified within a cell |

TABLE 2-continued

| Characteristic of the Fabric | Determination/Calculation |
| --- | --- |
| Unit Cell Knuckle Area (UKA) | warp UKA = warp KW × warp KL − ((2 × warp r)$^2$ − π(warp r)$^2$) <br> weft UKA = weft KW × weft KL − ((2 × weft r)$^2$ − π(weft r)$^2$) |
| Knuckle Density (KD) | warp KD = PD × warp KDUC <br> weft KD = PD × weft KDUC |
| Total Warp or Weft Knuckle Contact Area (%) | warp area % = warp KD × warp UKA <br> weft area % = weft KD × weft UKA |
| Total % In-Plane Knuckle Contact Area | TKCA = warp area % + weft area % |
| % Area Contribution (AC) | % warp AC = [warp UKA/(warp UKA + weft UKA)] × 100 <br> % weft AC = [weft UKA/(warp UKA + weft UKA)] × 100 |
| Pocket Area Estimate (PA) | PA = (1/PD) − (warp UKA × warp KDUC) − (weft UKA × weft KDUC) |
| Pocket Density (PD) (pockets per square inch or centimeter) | PD = freq 1 × [freq 2 × sin θ] |

It should be noted that, while some of the characteristics in TABLE 2 are determined or calculated in the same manner as those described above in TABLE 1, the knuckle density, the total warp or weft knuckle contact area, the contact area ratio, the percent area contribution, the pocket area estimate, and the pocket density characteristics are calculated differently in TABLE 2 than in TABLE 1. By accounting for the non-rectangular, parallelogram shape of the unit cells, these different calculations provide for more accurate estimations of the characteristics of fabrics that have non-rectangular, parallelogram shaped unit cells.

A technique for calculating the effective volume of the pockets of a structuring fabric will now be described. The effective volume of a pocket is the product of the cross-sectional area of the pocket at the surface of the structuring fabric (i.e., between the knuckle surfaces) and the depth of the pocket into which cellulosic fibers in the web can migrate during the papermaking process. The cross-sectional area of the pockets is the same as the estimate of the Pocket Area, as described in TABLES 1 and 2 above. The depth of pockets of a structuring fabric can be determined, as follows.

Figure 10:
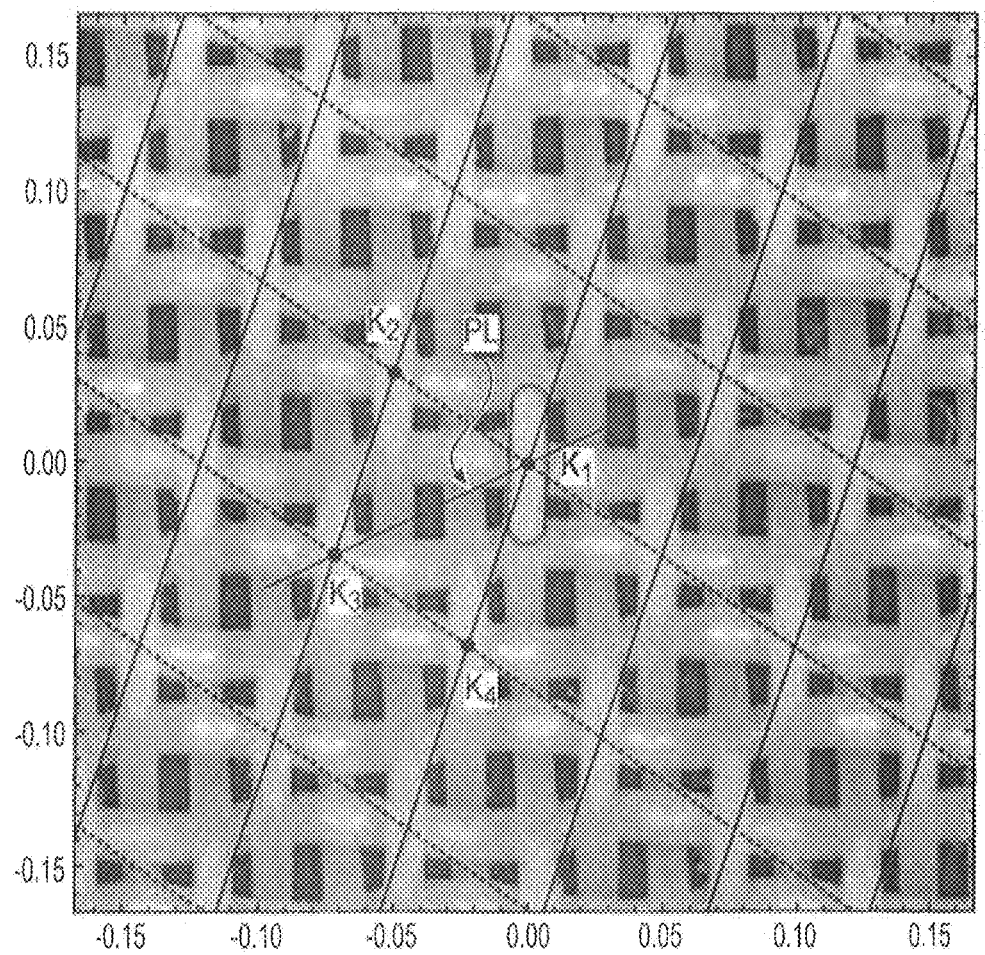
FIG. 10 shows the application of an analytic technique to determine a pocket surrounded by knuckles in the structuring fabric shown in FIG. 3.

FIG. 10 shows a magnified photograph of a structuring fabric. With the photograph, and using the image analysis program described above, four knuckles K1 to K4 are identified. A parallelogram has been drawn in a manner that connects the knuckles K1 to K4, with the lines of the parallelogram being drawn to not pass through the pocket area that is formed between the knuckles K1 to K4. With the parallelogram drawn, a profile direction line PL can be drawn that passes from the knuckle K1, through the center of the pocket, to knuckle K3. The profile direction line PL will be used to determine the pocket depth using a digital microscope, as described below. Note that the profile direction line PL from knuckle K1 and knuckle K3 passes through the center of the pocket. As will be described below, the pocket depth of a structuring fabric is determined as the depth in the pocket to which the cellulosic fibers could penetrate in the paper making process. In the case of the fabric shown in FIG. 10, the maximum fiber migration depth is at the center of the pocket. It follows that a profile direction line could alternatively be drawn from knuckle K2 to knuckle K4 passing through the center of the pocket, and the alternative profile direction line could be used for the pocket depth determination described below. Those skilled in the art will also recognize that different structuring fabrics will have different configurations of knuckles and pockets, but a profile direction line could easily be determined for different structuring fabrics in the same manner as the profile direction line is determined in FIG. 10.

Figure 11:
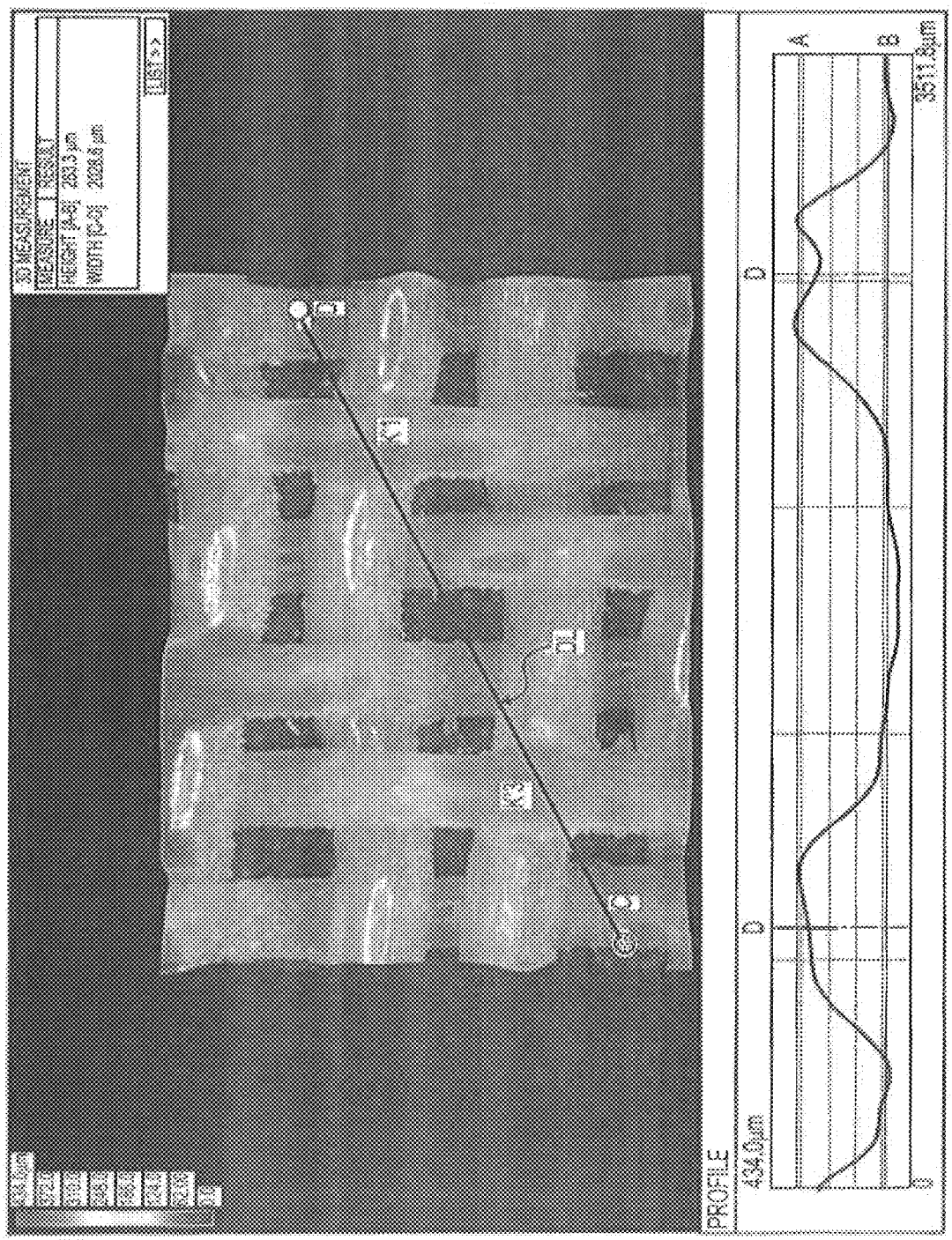
FIG. 11 shows the application of an analytic technique to determine the depth of the pocket shown in FIG. 10.

FIG. 11 is a screenshot of a program used to determine the profile of a pocket of the structuring fabric shown in FIG. 10. The screenshot was formed using a VHX-1000 Digital Microscope manufactured by Keyence Corporation of Osaka, Japan. The microscope was equipped with VHX-H3M application software, also provided by Keyence Corporation. The microscopic image of the pocket is shown in the top portion of FIG. 11. In this image, the knuckles K'1 and K'3 and the pocket between the knuckles can easily be seen. A depth determination line DL has been drawn from point D to point C, with the depth determination line DL passing through the knuckles K'1 and K'3 and through the center of the pocket. The depth determination line DL is drawn to closely approximate the profile determination line PL that is shown in FIG. 10. That is, based on inspection of the depth determination line DL derived using the knuckle and pocket image shown in FIG. 10, a user can draw the depth determination line DL in the microscopic image shown in FIG. 11, with the depth determination line DL passing through the areas that correspond to the knuckles K'3 and K'1 and the center portion of the pocket.

With the depth determination line DL drawn, the digital microscope can then be instructed to calculate the depth profile of the pocket along the depth determination line DL, as is shown in the bottom portion of FIG. 11. The profile of the pocket is highest at the areas corresponding to the knuckles K'3 and K'1, and the profile falls to its lowest point at the center of the pocket. The pocket depth is determined from this profile as starting from the height of the knuckles K'3 and K'1, which is marked by the line A on the depth profile. As with any two knuckles of a structuring fabric measured to this degree of precision, the knuckles K'3 and K'1 do not have the exact same height. Accordingly, the height A is determined as an average between the two heights of the knuckles K'3 and K'1. The pocket depth is determined as ending at a point just above the lowest point of the depth profile, marked by the line B on the depth profile. As those skilled in the art will appreciate, the depth of the pocket from line A to line B approximately corresponds to the depth in the pocket to which the cellulosic fibers in the web can migrate in a papermaking process. Note that the VHX-H3M software (discussed above) forms the full depth profile from a plurality of slices in the thickness direction of the fabric. Also, note that in forming the depth profile, the VHX-H3M software employs a filtering function to smooth the depth profile formed from the thickness slices.

It should be noted that the measured pocket depth will slightly vary from pocket to pocket in a fabric. We have found, however, that an average of five measured pocket depths for a structuring fabric provides a good characterization of the pocket depth. Accordingly, the measurements of pocket depth herein, and the measurements that follow from the measurement of the pocket depth, such as planar volumetric index, are an average over five measured pockets for the structuring fabric.

Using the foregoing techniques, the planar volumetric index for structuring fabrics may easily be calculated as the contact area ratio (CAR) multiplied by the effective pocket volume (EPV) multiplied by one hundred, where the EPV is the product of the pocket area estimate (PA in TABLE 1

Sanding the contact surface of a structuring fabric is an effective way to simulate the wear on the structuring fabric that occurs during a papermaking process. Specific amounts of the contact surface can be sanded off to simulate the wear on the structuring fabric after different amounts of operation on a papermaking machine. A sanding experiment was conducted on a fabric shown in FIG. 3 in order to simulate wear on the fabric. TABLE 3 shows the results of the sanding experiment by indicating properties of the structuring fabric, with the properties having been determined according to the above-described techniques, particularly the technique described in TABLE 1. More specifically, TABLE 3 shows the initial, unsanded, properties of the fabric shown in FIG. 3 referred to as Fabric Reference A. In Fabric Reference B, 0.109 mm of the contact surface was removed by sanding, in Fabric Reference C, 0.139 mm of the contact surface was removed by sanding, and in Reference D, 0.178 mm of the contact surface was removed by sanding.

TABLE 3

| Property | | Units | Fabric Reference A | Fabric Reference B | Fabric Reference C | Fabric Reference D |
|---|---|---|---|---|---|---|
| Amount of contact surface removed | | mm | None | 0.109 | 0.139 | 0.178 |
| In plane Warp | Contact Length | mm | 1.68 | 1.88 | 2.03 | 2.18 |
| | Contact Width | mm | 0.48 | 0.48 | 0.52 | 0.51 |
| | Warp Area | % | 22.7 | 25.5 | 29.8 | 31.6 |
| In plane Weft | Contact Length | mm | 0.03 | 0.03 | 0.03 | 0.03 |
| | Contact Width | mm | 0.03 | 0.03 | 0.03 | 0.03 |
| | Warp Area | % | 0.0 | 0.0 | 0.0 | 0.0 |
| Contact Area Ratio | | % | 22.7 | 25.0 | 29.8 | 31.7 |
| % Warp-Weft Ratio | Warp Area | % | 1.0 | 1.0 | 1.0 | 1.0 |
| | Weft Area | % | 0.0 | 0.0 | 0.0 | 0.0 |
| Pocket Density | | 1/cm$^2$ | 29.9 | 29.8 | 29.8 | 30.0 |
| Fabric Cell Definition | Freq R | 1/cm | 6.4 | 6.4 | 6.4 | 6.4 |
| | Degree | Degrees | 163.5 | 164.5 | 164.5 | 165 |
| | Freq B | 1/cm | 4.7 | 4.7 | 4.7 | 4.7 |
| | Degree | Degrees | 228 | 230 | 229 | 230 |
| Pocket Depth | | microns | 494.2 | 477.9 | 425.3 | 363.8 | above) and the measured pocket depth. Further, an adjusted planar volumetric index can be calculated as the contact area ratio (CAR) multiplied by the effective pocket volume (EPV) multiplied by one hundred, where the CAR and EPV are calculated using the non-rectangular, parallelogram unit cell area calculation technique described above (the EPV being the product of the pocket area estimate PA in TABLE 2 above and the measured pocket depth). The planar volumetric index and adjusted planar volumetric index for structuring fabrics used to form absorbent paper products according to the invention will be described below. The planar volumetric index and adjusted volumetric index for comparative structuring fabrics will also be described below.

Durability is another important aspect related to the structuring fabric used in a papermaking process. In particular, the web contacting surface formed by the knuckles in a structuring fabric is worn as the structuring fabric is used on a papermaking machine. The wear has the effect of increasing the size of the knuckles, which, in turn, has the effect of increasing the contact area of the structuring fabric. At the same time, the wear also has the effect of decreasing the pocket volume by decreasing the pocket depth. It follows that as the contact area increases and the pocket depth decreases, the planar volumetric index and adjusted planar volumetric index for the structuring fabric change. The changes in planar volumetric index and adjusted planar volumetric index will affect the properties of the resulting paper products, for example, by changing the size of the dome structures formed in the resulting paper products.

As can be seen from the data in TABLE 3, the contact area did not significantly increase as sanding was applied to the structuring fabric. Without being bound by theory, it is believed that the relatively constant contact area can result from warp yarns of a structuring fabric having a substantially flat shape, as is the case with the particular fabric tested for TABLE 3. The data shown in TABLE 2 also demonstrates that the pocket depth did not significantly decrease as the contact surface of the fabric was sanded. With the contact area and pocket depth remaining relatively constant, it follows that the planar volumetric index also remained relatively constant as the fabric was subjected to more sanding. The constant planar volumetric index indicates that the fabric will be likely to produce paper products with consistent properties through the life of the fabric on a papermaking machine. Along these lines, it has been found that the 0.109 mm of surface removed in the sanding trial with Fabric Reference B closely corresponds to about 950,000 cycles of operation during a TAD process on a papermaking machine having the configuration shown in FIG. 1 (as described above). The relatively small changes in the contact area and the pocket depth in the structuring fabric after such a number of cycles of operation is remarkable.

It should be noted that even though the unsanded fabric shown in FIG. 3 and characterized as Reference A in TABLE 3 has outstanding properties such as planar volumetric index, it will still often be desirable to sand the web contacting surface of the fabric before using the fabric in a papermaking operation. For example, sanding may be used to make the contact surface of the fabric more planar prior to its initial use in a papermaking operation. It should also be noted that the term "sanding," as used herein, is a general term intended to denote the removal of a small amount of material from the surface of the fabric. The term sanding is not meant to be limited to any particular technique for removing the material. For example, sanding encompasses operations that might also be termed "polishing," "grinding," or the like.

The calculated planar volumetric index and adjusted planar volumetric index for the structuring fabric in References A to D is shown in FIG. 12A. The planar volumetric index and adjusted planar volumetric index for Comparative Fabrics are also shown in FIG. 12A, as well as in FIGS. 12B through 12D. The Comparative Fabrics are structuring fabrics that are known in the art. A print of the fabrics showing the knuckle and pocket structure is also shown in FIGS. 12A through 12D.

The data in FIGS. 12A through 12D show the substantial differences between the planar volumetric index in the structure fabric of References A to D and the Comparative Fabrics 1 to 10. The planar volumetric indexes in References A to D were between about 26 and about 30, whereas the planar volumetric indexes in the Comparative Fabrics 1 to 10 were much lower. Similarly, the adjusted planar volumetric indexes in References A to D were between about 27 and about 31.5, whereas the adjusted planar volumetric indexes in the Comparative Fabrics 1 to 10 were much lower. Those skilled in the art will appreciate many advantages of the combination of contact area ratio and pocket volume that are quantified by the planar volumetric index and adjusted planar volumetric index of the structuring fabric in References A to D. For example, the greater contact area provides more of a support surface for the web during the paper making process, in effect, providing an almost belt-like forming surface. As another example, the greater pocket depth allows the fabric to run for a longer period of time before becoming too worn for effective use. That is, the initially deep pockets will still have an effective depth even after the contact surface is substantially worn during a papermaking process. The deep pockets also may allow for greater caliper products to be formed. More specifically, the caliper of the resulting product is partially related to the dome-structures of product that are formed by portions of the web moving into the pockets during the papermaking process. By providing bigger pockets, the structuring fabric of References A to D provides for larger domes, which, in turn, provide for more caliper in the final paper product. Without being bound by theory, it is believed that these aspects flowing from the planar volumetric indexes and adjusted planar volumetric indexes of the structuring fabric of References A to D are at least partially the cause of the outstanding properties of the products according to our invention that are described in detail below.

Notably, the planar volumetric and adjusted planar volumetric indexes for the fabric in References A to D are within a narrow ranges described above. As discussed above, References A to D simulate the wear on the fabric during its operation on a papermaking machine as shown in FIG. 1, and it has been found that Fabric Reference B correlates to about 950,000 cycles of operation on the papermaking machine. Thus, when used in a papermaking process as described above, including non-compactively dewatering and drying the cellulosic web on the structuring fabric, the fabric of References A to D will have a planar volumetric index of at least about 26, and a adjusted planar volumetric index of at least about 27, through 950,000 cycles of operation of the papermaking machine.

The fabric that is shown and characterized in FIGS. 3 and 12A and TABLE 3 can be used to form paper products, such as absorbent sheets in the form of hand towels. We have found that such paper products manufactured with the structuring fabric have an outstanding combination of properties. These properties will now be described, followed by specific examples of products made with the structuring fabric.

As generally discussed above, one significant aspect of any paper product is the caliper of the product. Generally speaking, the more caliper the better. In some embodiments of the invention two-ply paper products, such as absorbent sheets, have a caliper of at least about 255 mils/8 sheets. In still further embodiments of the invention, the two-ply paper products have a caliper of at least about 260 mils/8 sheets, and further, the two-ply products have a caliper of at least about 265 mils/8 sheets. It should be noted that the two plies of these products are directly attached without an intermediately ply, as discussed above. Those skilled in the art will appreciate that such calipers for two-ply products are, in and of themselves, outstanding.

Also discussed above is the importance of the absorbency of paper products, particularly in products such as absorbent hand towels. The paper products of our invention have exceptional absorbency, as quantified by saturation (SAT) capacity. SAT capacity is measured with a simple absorbency tester. In this test, a sample product 2.0 inches (5.08 cm) in diameter is mounted between a top flat plastic cover and a bottom grooved sample plate. The sample is held in place by a ⅛ inch (0.32 cm) wide circumference flange area. The sample is not compressed by the holder. Deionized water at 73° F. (22.8° C.) is introduced to the sample at the center of the bottom sample plate through a three mm diameter conduit. This water is at a hydrostatic head of minus five mm. Flow is initiated by a pulse introduced at the start of the measurement by the instrument mechanism. Water is thus imbibed by the sample from this central entrance point radially outward by capillary action. When the rate of water imbibation decreases below 0.005 g water per five seconds, the test is terminated. The amount of water removed from the reservoir and absorbed by the sample is weighed and reported as grams of water per gram of sample or per square meter of sample. The absorbed amount ($g/m^2$) is used for purposes of calculating SAT converting loss. When testing a basesheet for multi-ply towel, the number of plies used in the towel is tested. For example, two plies of basesheet are stacked and tested, then compared with two-ply finished product made from the basesheet for purposes of determining SAT converting loss. In practice, a Gravimetric Absorbency Testing System manufactured by M/K Systems Inc. of Danvers, Mass. is used. Water absorbent capacity (SAT) is actually determined by the instrument itself. SAT is defined as the point where the weight versus time graph has a "zero" slope, i.e., the sample has stopped absorbing. The termination criteria for a test are expressed in maximum change in water weight absorbed over a fixed time period. This is basically an estimate of zero slope on the weight versus time graph. The program uses a change of 0.005 g over a five second time interval as termination criteria, unless "Slow SAT" is specified, in which case, the cut off criteria is one mg in 25 seconds.

In embodiments of our invention, two-ply paper products have an SAT capacity of at least about 650 $g/m^2$. In further embodiments of our invention, the two-ply paper products have an SAT capacity of at least about 675 $g/m^2$. As with the calipers for the two-ply products described above, these SAT capacities for two-ply paper products are, in and of themselves, outstanding. In fact, as will be demonstrated with the specific examples described below, the combination of caliper and SAT capacity for the two-ply paper products according to our invention is not found in conventional paper products.

Another significant aspect of paper products according to our invention is related to the tensile and stretch ratios of the products. Dry tensile strengths (MD and CD) and stretch at break are measured with a standard Instron® test device or other suitable elongation tensile tester that may be configured in various ways, typically, using 3 inch (76.2 mm) or 1 inch (25.4 mm) wide strips of tissue or towel, conditioned in an atmosphere of 23°±1° C. (73.4°±1° F.) at 50% relative humidity for 2 hours. The tensile test is run at a crosshead speed of 2 in/min (50.8 mm/min). The tensile ratio of a paper product is the ratio of the tensile strength of the product in the MD of the product to the tensile strength of the product in the CD. Similarly, the stretch ratio of a paper product is the ratio of the MD stretch at break to the CD stretch at break of the product.

In embodiments of our invention, paper products are provided that have a tensile ratio of less than about 1.1, and in still further embodiments, paper products are provided that have a tensile ratio of less than about 1.0. As will be appreciated by those skilled in the art, these tensile ratios are less than the tensile ratio for other products known in the art. It follows that paper products according to our invention exhibit more CD tensile than other paper products known in the art. The result is that paper products according to our invention have a more consistent tensile strength in all directions, i.e., the tensile strength is about the same in the MD and CD directions of the products.

In addition to the caliper, absorbency, and tensile properties, there are other properties that are important to paper products. For example, as discussed above, the perceived softness of paper products such as absorbent hand towels is highly desirable. But, at the same time, softness is usually inversely proportional to the absorbency and caliper of paper products. While the paper products according to our invention have higher absorbency and caliper than comparative paper products, the paper products do not have a greatly reduced softness in comparison to other paper products. This can be seen in sensory softness tests conducted on the paper products. Sensory softness of the paper products can be determined by using a panel of trained human subjects in a test area conditioned to TAPPI standards (temperature of 71.2° F. to 74.8° F., relative humidity of 48% to 52%). The softness evaluation relies on a series of physical references with predetermined softness values that are always available to each trained subject as they conducted the testing. The trained subjects directly compare test samples to the physical references to determine the softness level of the test samples. The trained subjects then assign a number to a particular paper product, with a higher sensory softness number indicating a higher the perceived softness. As will be demonstrated in the specific examples of paper products according to our invention described below, the sensory softness of our inventive paper products is very good, even though the inventive products have a higher caliper and absorbency than other known paper products.

Those skilled in the art will recognize that there is a variety of other important properties of paper products, such as the basis weight or bulk, stretch, tensile modulus, SAT rate, geometric mean (GM) break and tensile modulus, etc. In particular, the importance of basis weight or bulk to the economics of paper manufacturing is discussed above. Additional properties of the paper products according to our invention are given for the specific examples described below.

In order to demonstrate the excellent properties of the paper products according to our invention, trials were conducted wherein the products were manufactured using a TAD process on a papermaking machine having the general configuration shown in FIG. 1 and described above. In these trials, a structuring fabric as shown in FIG. 3, and having the properties characterized in FIG. 12A and TABLE 3, was used in the papermaking machine. The specific experimental conditions for the trials are shown in TABLE 4.

TABLE 4

|  | Trials A | Trials B | Trails C | Trials D | Trials E |
| --- | --- | --- | --- | --- | --- |
| Furnish | 60% B16, 40% B10, Broke as available; Yankee layer 100% B16 | 60%B16, 40% B10, Broke as available; Yankee layer 100% B16 | 60% B16, 40% B10, Broke as available; Yankee layer 100% B16 | 60% B16, 40% B10, Broke as available; Yankee layer 100% B16 | 60%B16, 40% B10, Broke as available; Yankee layer 100% B16 |
| Lab BW (lb/rm) OD | ≥14.8 | 14.7 | 14.8 | 13.9 | 14.8 |
| Lab Conditioned Wt (lb/rm), 3% M.C. | ≥15.3 | 15.1 | 15.3 | 14.3 | 15.3 |
| Jet to Wire Ratio | 1.08 | 1.08 | 1.08 | 1.08 | 1.08 |
| Headbox Flow (GPM/inch) | 163 | 163 | 163 | 163 | 163 |
| Fabric Crepe | <22% | 12% | 23% | 12% | 23% |
| Reel Crepe | 0% | 1% | 1% | 1% | 1% |
| DAF Sludge | Sewer | Sewer | Sewer | Sewer | Sewer |
| Both LF Refiner, HPDT | Adjust as needed | Adjust as needed | Adjust as needed | Adjust as needed | Adjust as needed |
| Tickler Refiner, HPDT | Adjust as needed | Adjust as needed | Adjust as seeded | Adjust as needed | Adjust as needed |
| Tickler Refiner Layer Direction | Air | Air | Air | Air | Air |
| Yankee Speed (FPM) | 3850 | 4000 FPM | 4000 FPM | 4000 FPM | 4000 FPM |
| TAD Release (mg/m²) | 65 | 65 | 65 | 65 | 65 |
| Wet Strength Resin (Amrez 100 HP by Gerogia Pacific) (lb/ton) | 16.0 lb and adjust as needed | 13.0 lb/ton and adjust as needed | 16.0 lb/ton and adjust as needed | 15.0 lb/ton and adjust as needed | 19.0 lb/ton and adjust as needed |

TABLE 4-continued

| | Trials A | Trials B | Trails C | Trials D | Trials E |
|---|---|---|---|---|---|
| CMC (lb/ton) | 5.5 lb/ton and adjust as needed | 3.0 lb/ton and adjust as needed | 5.5 lb/ton and adjust as needed | 5.0 lb/ton and adjust as needed | 8.5 lb/ton and adjust as needed |
| Total Yankee coating add o mg/m$^2$ | 30 mg/m$^2$ and adjust as needed | 30 mg/m$^2$ and adjust as needed | 30 mg/m$^2$ and adjust as needed | 30 mg/sq m and adjust as needed | 30 mg/sq m and adjust as needed |
| Debonder (lb/ton) | 0 | 0 | 0 | 0 | 0 |
| PVOH:PAE Ratio | 56%/44% | 56%/44% | 56%/44% | 56%/44% | 56%/44% |
| Modifier (mg/m$^2$) | 1.1 | 1.1 | 1.1 | 1.1 | 1.1 |
| Crepe blade bevel Angle (degrees) | 20 | 20 | 20 | 20 | 20 |
| Post TAD2 Moisture | 18.0% | 18.0% | 18.0% | 18.0% | 18.0% |
| TAD1 Gap Pressure (WC) | 0.2 | 0.2 | 0.2 | 0.2 | 0.2 |
| Headbox Charge (ml/10 mil sample) | 0 to −0.5 | 0 to −0.5 | 0 to −0.5 | 0 to −0.5 | 0 to −0.5 |
| Reel Moisture | 3.0% | 3.0% | 3.0% | 3.0% | 3.0% |
| CMC/WSR Split (Y/M/A) | 35/30/35 | 35/30/35 | 35/30/35 | 35/30/35 | 35/30/35 |
| Basesheet Physical Targets | | | | | |
| Basis Weight AD (lb/rm) | 15.3(2) 16.3(2A) | 15.1 | 15.3 | 14.3 | 15.3 |
| Caliper (mils/S sheets) | ~140 | 128 | 155 | 129 | 150 |
| MD Dry Tensile (g/3 in.) | 1350 | 1430 | 1430 | 1430 | 1430 |
| CD Dry Tensile (g/3 in.) | 1350 | 1430 | 1430 | 1430 | 1430 |
| MD Stretch (%) | 21 | 15 | 22 | 15 | 22 |
| CD Wet Tensile (g/3 in.) | 405 | 390 | 400 | 400 | 400 |
| CD wet/dry (%) | 30.0 | 27.0 | 28.0 | 28.0 | 28.0 |
| LF 1&2 Refining (HPDT) | >1.0/1.0 | Adjust as needed | Adjust as needed | Adjust as needed | Adjust as needed |

The basesheets produced in Trials A to E were converted into two-ply absorbent sheets using standard conversion equipment. The conversion process included embossing using the pattern shown in U.S. Design Pat. No. 648,137 (the disclosure of which is incorporated by reference in its entirety). The emboss penetration was set at 0.075 inches for some trials, and at 0.120 inches for other trials. The specific converting process parameters are shown in TABLE 5.

TABLE 5

| Parameter | Value |
|---|---|
| Emboss Pattern | U.S. Design Pat. No. 648,137 at 0.075 inches or 0.120 inches |
| Emboss Roll Diameter | 20 inches |
| Rubber Back-up Roll Hardness | Durometer 55 Shore A |
| Rubber Back-up Roll Diameter | 20 inches |
| Rubber Roll Cover Thickness | 0.625 inches |
| Marrying Roll Diameter | 14 inches |
| Marrying Roll Hardness | Durometer 93 Shore A |
| Feed Roll Gap | 0.030 inches |
| Line Speed (rewinder) | 850 fpm (21 logs per minute) |

The converted, two-ply absorbent sheets from some of the trials were then tested to determine characteristics of the sheets, including SAT capacity, caliper, tensile ratio, stretch ratio, and sensory softness. The determined characteristics are shown in TABLES 6 and 7. Note that the indication "N/D" in TABLES 6 and 7 is an indication that the parameter was not measured for the particular trial.

TABLE 6

| Trial | Basis Weight (lbs/ream) | Caliper (mils/8 sheets) | MD Tensile (g/3 in.) | CD Tensile (g/3 in.) | GM Tensile (g/3 in.) | MD Stretch (%) | CD Stretch (%) | CD Wet Tensile - Finch (g/3 in.) | CD Wet/Dry - Finch (%) |
|---|---|---|---|---|---|---|---|---|---|
| Product 1 | 31.52 | 270.8 | 2448 | 2502 | 2475 | 24.7 | 10.7 | 619 | 24.7 |
| Product 2 | 31.95 | 259.6 | 2802 | 3049 | 2922 | 23.2 | 10.2 | 831 | 27.3 |
| Product 3 | 32.27 | 260.2 | 2823 | 3065 | 2941 | 23.4 | 10.1 | 829 | 27.0 |
| Product 4 | 31.94 | 266.6 | 2623 | 2694 | 2658 | 23.0 | 10.6 | 741 | 27.5 |
| Product 5 | 32.19 | 259.6 | 2775 | 3118 | 2941 | 24.0 | 10.2 | 889 | 28.5 |
| Product 6 | 31.94 | 263.1 | 2673 | 2945 | 2805 | 23.2 | 10.3 | 847 | 28.8 |
| Product 7 | 31.54 | 262.8 | 2547 | 2742 | 2642 | 23.1 | 10.3 | 817 | 29.8 |
| Product 8 | 31.93 | 263.7 | 2406 | 2725 | 2560 | 23.7 | 10.1 | 777 | 28.5 |
| Product 9 | 32.00 | 262.9 | 2492 | 2967 | 2719 | 23.5 | 10.0 | 814 | 27.4 |
| Product 10 | 27.73 | 229.6 | 2103 | 2176 | 2139 | 21.5 | 10.3 | 597 | 27.4 |
| Product 11 | 29.25 | 223.9 | 2794 | 2669 | 2730 | 15.2 | 8.6 | 723 | 27.1 |
| Product 12 | 30.92 | 235.3 | 3219 | 3097 | 3157 | 15.2 | 8.5 | 850 | 27.4 |
| Product 13 | 31.33 | 216.2 | 3054 | 2863 | 2957 | 14.4 | 7.5 | 774 | 27.0 |
| Product 14 | 31.41 | 221.1 | 2901 | 3006 | 2953 | 14.3 | 7.6 | 789 | 26.3 |
| Product 15 | 30.28 | 221.0 | 2764 | 2810 | 2787 | 14.2 | 7.3 | 781 | 27.8 |
| Product 16 | 31.22 | 218.6 | 3143 | 3132 | 3138 | 14.8 | 8.0 | 804 | 25.7 |
| Product 17 | 30.95 | 216.3 | 2727 | 2627 | 2676 | 15.2 | 8.0 | 659 | 25.1 |
| Product 18 | 31.30 | 217.4 | 3033 | 2837 | 2933 | 16.5 | 8.1 | 767 | 27.0 |

TABLE 6-continued

| Trial | Basis Weight (lbs/ream) | Caliper (mils/8 sheets) | MD Tensile (g/3 in.) | CD Tensile (g/3 in.) | GM Tensile (g/3 in.) | MD Stretch (%) | CD Stretch (%) | CD Wet Tensile - Finch (g/3 in.) | CD Wet/Dry - Finch (%) |
|---|---|---|---|---|---|---|---|---|---|
| Product 19 | 31.15 | 219.9 | 3099 | 2921 | 3008 | 15.4 | 7.9 | 708 | 24.2 |
| Product 20 | 31.68 | 216.7 | 3111 | 3120 | 3115 | 15.9 | 8.1 | 781 | 25.0 |
| Product 21 | 31.56 | 222.5 | 2803 | 2619 | 2709 | 16.7 | 8.2 | 687 | 26.2 |
| Product 22 | 31.44 | 215.4 | 3031 | 2975 | 3003 | 15.6 | 7.8 | 779 | 26.2 |
| Product 23 | 31.54 | 222.5 | 3514 | 3168 | 3336 | 15.4 | 7.8 | 884 | 27.9 |
| Product 24 | 31.48 | 219.6 | 3403 | 3519 | 3460 | 15.3 | 7.8 | 948 | 26.9 |

TABLE 7

| Trial | Perf Tensile (g/3 in.) | SAT Capacity (g/m²) | SAT Capacity (g/g) | SAT Rate (g/sec$^{-1/2}$) | GM Break Modulus (g/%) | GM Tensile Modulus (g/in/%) | Roll Diameter (inches) | Roll Compression (%) | Sensory Softness | MDS/CDS | Tensile Ratio |
|---|---|---|---|---|---|---|---|---|---|---|---|
| Product 1 | 582 | 679 | 13.2 | 0.27 | 152.7 | 41.7 | 4.96 | 11.9 | 5.8 | 2.31 | 0.98 |
| Product 2 | 752 | 708 | 13.6 | 0.34 | 189.8 | 59.6 | 4.94 | 11.6 | 5.5 | 2.27 | 0.92 |
| Product 3 | 784 | 705 | 13.4 | 0.39 | 189.3 | 60.3 | 4.94 | 12.0 | 5.3 | 2.30 | 0.92 |
| Product 4 | 698 | 706 | 13.6 | 0.37 | 169.8 | 50.0 | 4.98 | 10.8 | 5.9 | 2.17 | 0.97 |
| Product 5 | 727 | 729 | 13.9 | 0.40 | 188.4 | 61.0 | 5.03 | 12.8 | 5.3 | 2.36 | 0.89 |
| Product 6 | 768 | 716 | 13.8 | 0.40 | 180.6 | 55.8 | 5.01 | 11.4 | 5.3 | 2.24 | 0.91 |
| Product 7 | 664 | 730 | 14.2 | 0.40 | 171.3 | 50.8 | 5.02 | 11.4 | 5.7 | 2.24 | 0.93 |
| Product 8 | 698 | 716 | 13.8 | 0.39 | 165.5 | 52.9 | 5.03 | 10.6 | 5.8 | 2.35 | 0.88 |
| Product 9 | 680 | 726 | 13.9 | 0.40 | 177.0 | 52.3 | 5.06 | 11.3 | 5.65 | 2.34 | 0.84 |
| Product 10 | 669 | 674 | 14.9 | 0.38 | 144.5 | 44.0 | 5.95 | 5.9 | N/D | 2.09 | 0.97 |
| Product 11 | 674 | 629 | 13.2 | 0.27 | 238.1 | 63.2 | 4.79 | 12.9 | N/D | 1.77 | 1.05 |
| Product 12 | 834 | 598 | 11.9 | 0.30 | 277.5 | 63.9 | 5.35 | 12.4 | 5.2 | 834 | N/D |
| Product 13 | 674 | 566 | 11.1 | 0.26 | 281.1 | N/D | N/D | N/D | 6.1 | 674 | N/D |
| Product 14 | 735 | 569 | 11.1 | 0.24 | 284.0 | N/D | N/D | N/D | 5.9 | 735 | N/D |
| Product 15 | N/D | 577 | 11.7 | 0.27 | 273.8 | N/D | N/D | N/D | 5.9 | N/D | N/D |
| Product 16 | N/D | 554 | 10.9 | 0.24 | 289.1 | N/D | N/D | N/D | 5.8 | N/D | N/D |
| Product 17 | N/D | 571 | 11.3 | 0.26 | 243.1 | N/D | N/D | N/D | 6.6 | N/D | N/D |
| Product 18 | N/D | 553 | 10.9 | 0.25 | 255.8 | N/D | N/D | N/D | 6.2 | N/D | N/D |
| Product 19 | N/D | 581 | 11.5 | 0.26 | 273.9 | N/D | N/D | N/D | 6.0 | N/D | N/D |
| Product 20 | N/D | 547 | 10.6 | 0.26 | 274.7 | N/D | N/D | N/D | 5.6 | N/D | N/D |
| Product 21 | N/D | 549 | 10.7 | 0.25 | 231.5 | N/D | N/D | N/D | 6.0 | N/D | N/D |
| Product 22 | N/D | 562 | 11.0 | 0.30 | 269.3 | N/D | N/D | N/D | 5.8 | N/D | N/D |
| Product 23 | N/D | 597 | 11.6 | 0.31 | 308.7 | N/D | N/D | N/D | 5.6 | N/D | N/D |
| Product 24 | N/D | 604 | 11.8 | 0.36 | 316.6 | N/D | N/D | N/D | 5.3 | N/D | N/D |

Figure 13:
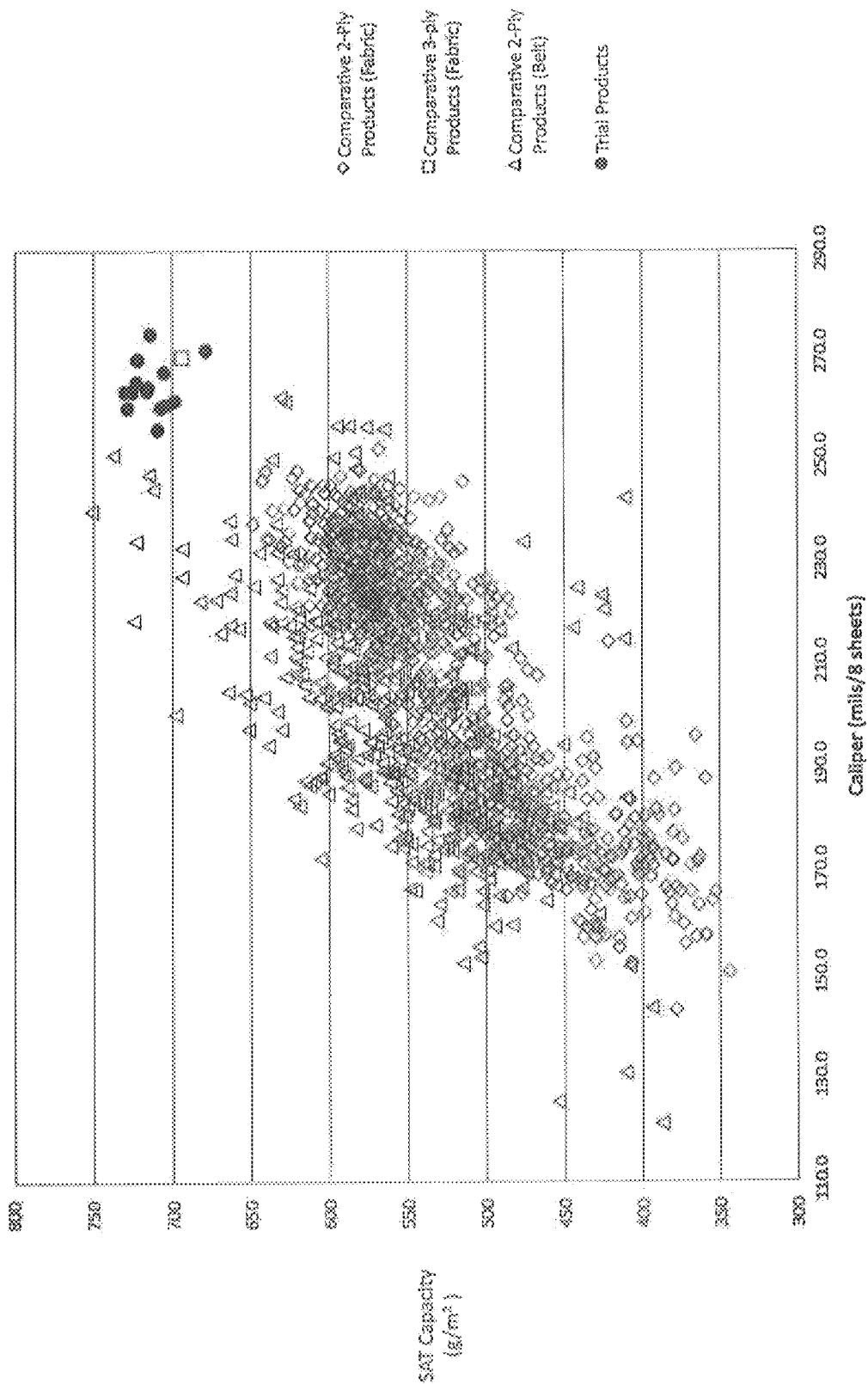
FIG. 13 is a plot showing the relation of caliper and SAT capacity for trial products according to the invention and for comparative products.

The combination of high caliper and good absorbency of the paper products according to our invention is not found in other paper products known in the art. Evidence of this can be seen in FIG. 13, which shows the SAT capacity in relation to caliper for products made according to the techniques described above. FIG. 13 also shows comparative two-ply and comparative three-ply absorbent products made by the assignee of the present application, as well as by other manufacturers. The comparative two-ply and three-ply products include products made in papermaking processes with structuring fabrics, as well as two-ply products made with structuring belts instead of structuring fabrics. As can be seen from this data, the trial products according to our invention all had an outstanding combination of caliper and SAT capacity. Specifically, the two-ply trial products had a caliper of at least about 255 mils/8 sheets and an SAT capacity of at least about 650 g/m². Further, some of the trial products had an SAT capacity of more than 700 g/m, and four trial products had a caliper of greater than 265 mils/8 sheets. On the other hand, none of the two-ply comparative products had the combination of caliper and SAT capacity of the two-ply trial products. The only product that had the combination of SAT capacity and caliper was a three-ply comparative product. Of course, as will be appreciated by those skilled in the art, the cost associated with manufacturing a three-ply product is significantly greater than that for a two-ply product.

As discussed in detail above, the absorbency and caliper of paper products, are, in general, inversely related to the perceived softness of the paper products. The data in TABLES 6 and 7, in combination with the data shown in FIG. 13 demonstrates the outstanding combination absorbency, caliper, and softness for the products of our invention. While our inventive paper products demonstrate high absorbency and caliper, the softness of the paper products, as indicated by the sensory softness values indicated in TABLES 6 and 7, was still relatively high. For comparison, similar commercially marketed hand towels may generally have a sensory softness of 5.1 to 6.8.

Figure 14:
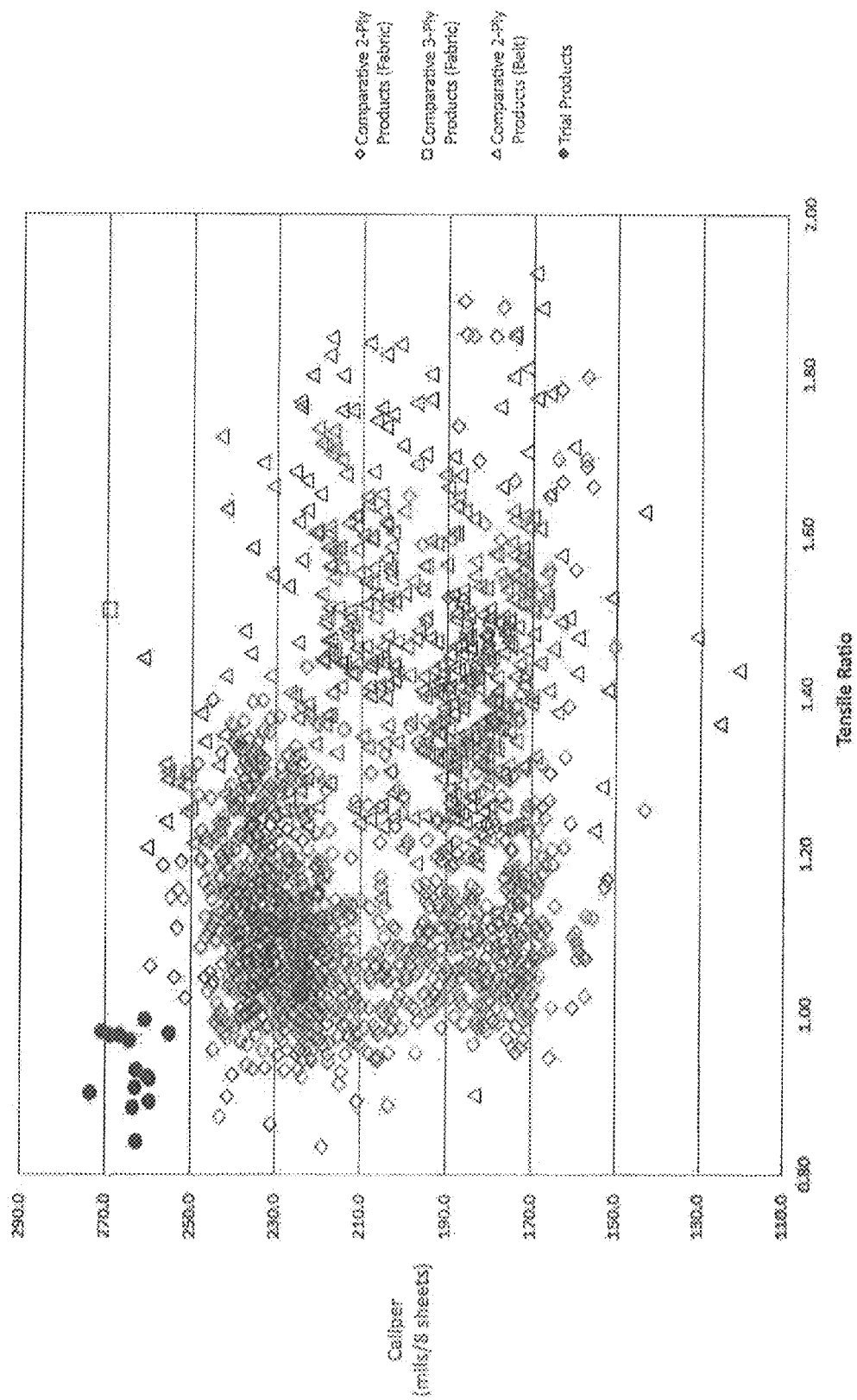
FIG. 14 is a plot showing the relation of tensile ratio and caliper for trial products according to the invention and for comparative products.

FIG. 14 shows further properties of the trial products according to our invention, as well as additional properties of comparative two-ply and three-ply products. Specifically, FIG. 14 shows the relation of tensile ratio and caliper for the trial products and the same comparison products shown in FIG. 13. The trial products all had a tensile ratio of less than about 1.00 with the SAT capacities of at least about 650 g/m². More specifically, the trial products had tensile ratios from about 0.85 to about 1.0. On the other hand, most of the comparison products had a tensile ratio of greater than 1.00.

As discussed above, tensile ratios in the ranges of the trial products provide for products that have more consistent strength in all directions. The comparison products having tensile ratios significantly greater than 1.0 do not have a consistent strength in all directions, but rather, show significantly more strength in the MD than in the CD.

Figure 15:
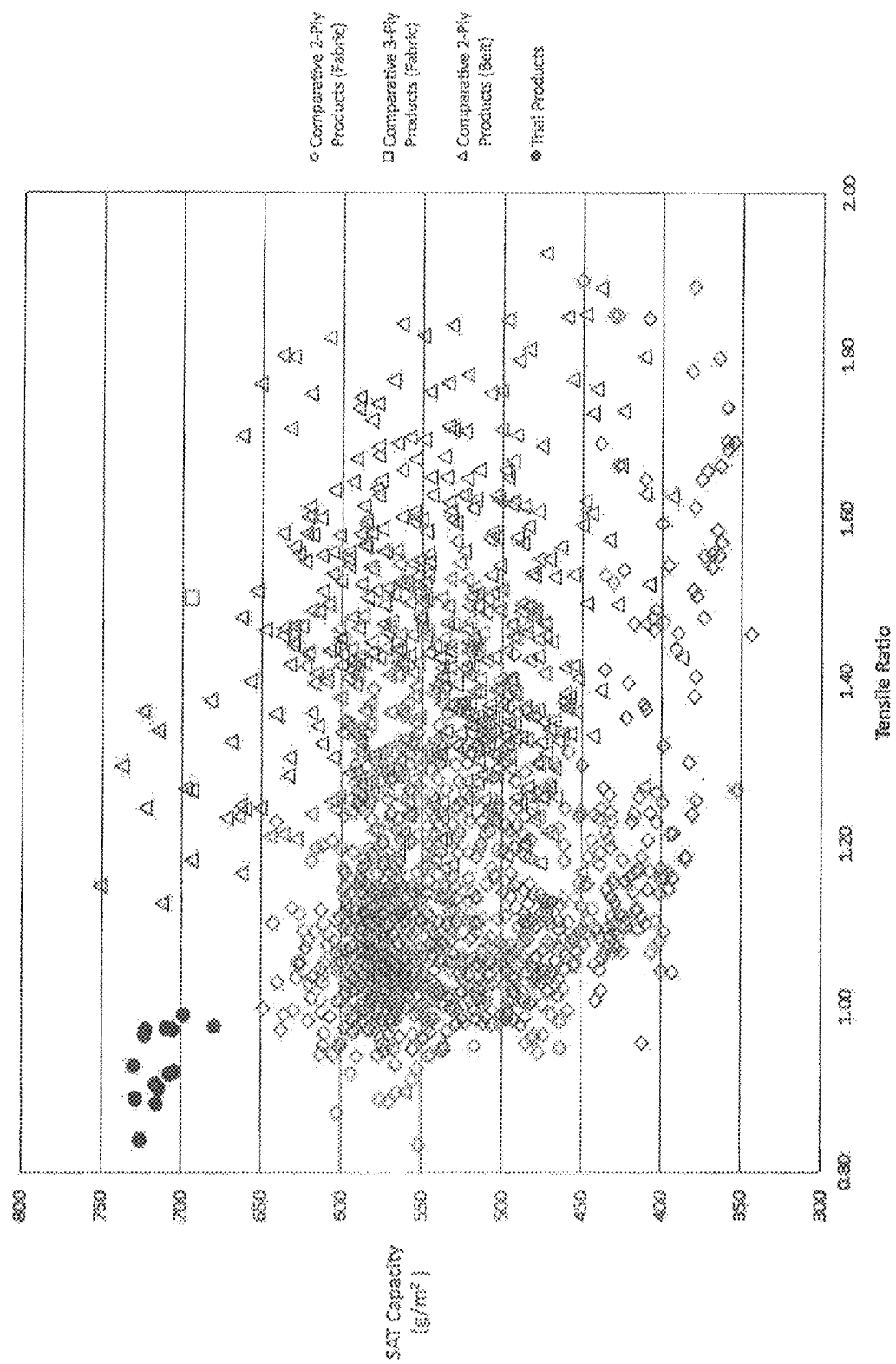
FIG. 15 is a plot showing the relation of tensile ratio and SAT capacity for trial products according to the invention and for comparative products.
Figure 16:
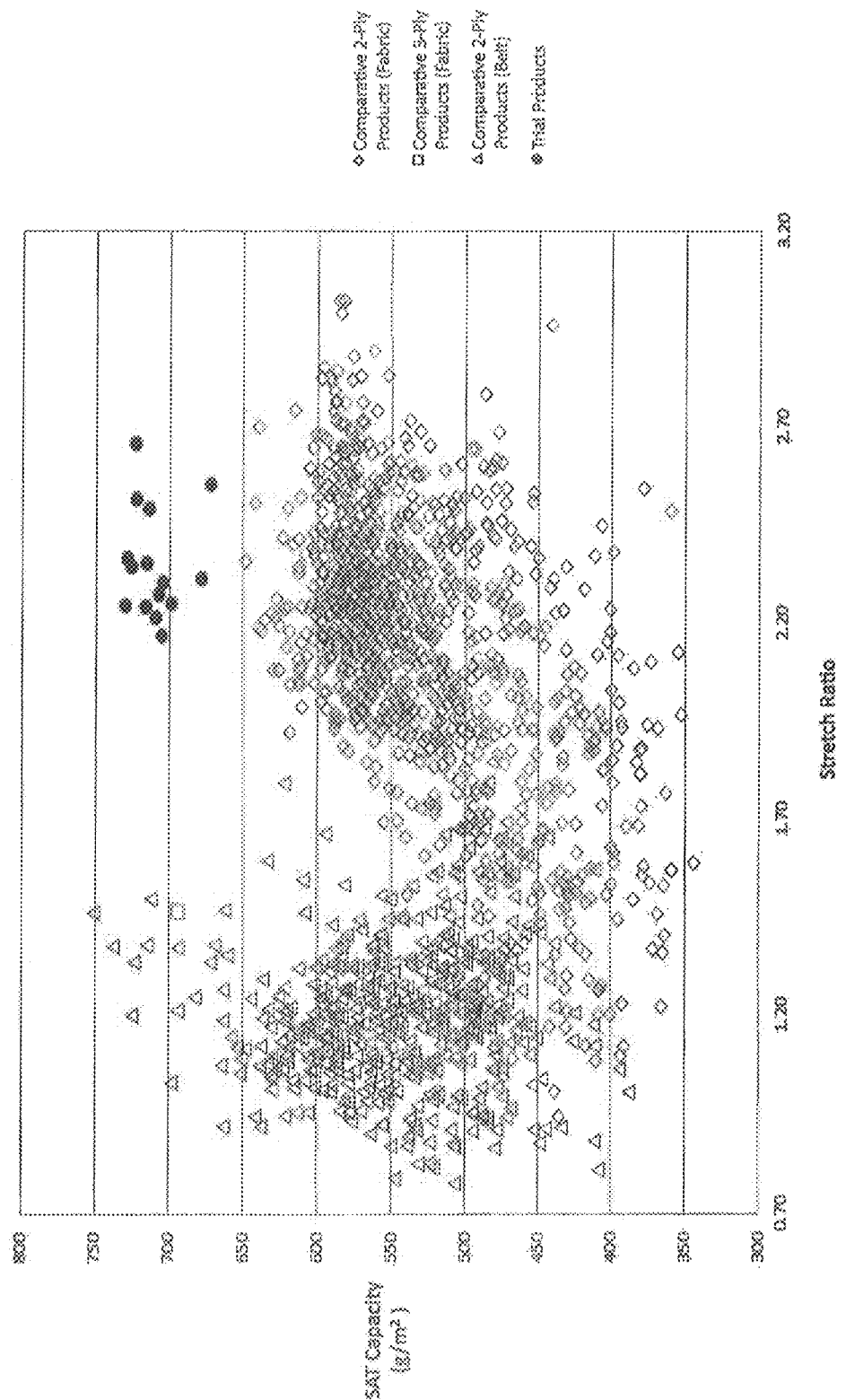
FIG. 16 is a plot showing the relation of stretch ratio and SAT capacity for trial products according to the invention and for comparative products.
Figure 17:
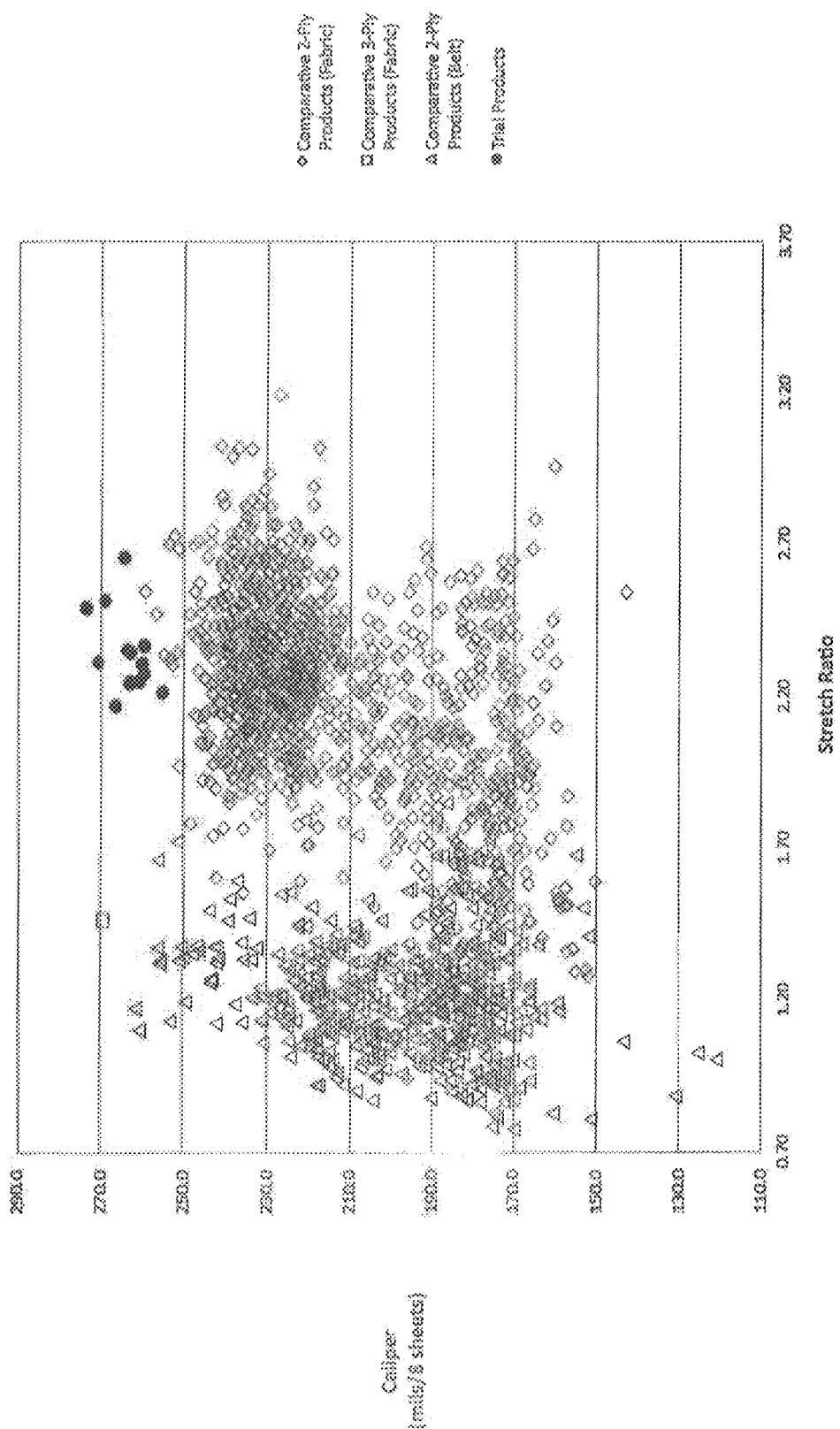
FIG. 17 is a plot showing the relation of stretch ratio and caliper for trial products according to the invention and for comparative products.

Further distinct properties of the products according to our invention can be seen in FIGS. 15 through 17. FIG. 15 demonstrates the SAT capacity as a function of tensile ratio for the trial products according to our invention and the comparison paper products. As discussed above, the two-ply trial products had SAT capacities of at least about 650 g/m², and tensile ratios of about 0.85 to about 1.0. As is evident from FIG. 15, this combination of SAT capacity and tensile ratio make the trial products distinct from the two-ply and three-ply comparison products. FIGS. 16 and 17 show the stretch ratio in relation to SAT capacity and caliper, respectively, for trial products according to the invention and the comparison products. Once again, it can be seen that the trial products had unique combinations of properties that are not found in any of the comparison products.

Although the foregoing specific examples of products had a generally narrow range of parameters such as basis weight, absorbency, caliper, etc., that are conducive to specific commercial products, such as hand towels, it will be appreciated by those skilled in the art that the techniques and methods disclosed herein can be used to produce a variety of products. To demonstrate the broad scope of our invention, a variety of basesheets was produced using the techniques described above, including a TAD process on a papermaking machine having the configuration shown in FIG. 1, and using the structuring fabric characterized in FIGS. 3 and 12A and TABLES 3 and 4. The properties of these basesheets are shown in TABLE 8.

TABLE 8

| Basesheet | Basis Weight (lb/rm) | Caliper (mils/8 sheets) | MD Tensile (g/3 in.) | MD Stretch (%) | CD Tensile (g/3 in.) | Tensile Ratio | CD Wet Tensile - Finch (g/3 in.) |
|---|---|---|---|---|---|---|---|
| 1 | 17.4 | 158 | 1752 | 26.3 | 1835 | 0.96 | 514 |
| 2 | 15.7 | 158 | 1284 | 24.6 | 1415 | 0.91 | 416 |
| 3 | 15.7 | 164 | 1617 | 27.0 | 1292 | 1.26 | 398 |
| 4 | 14.5 | 143 | 1431 | 17.1 | 1397 | 1.03 | 418 |
| 5 | 13.5 | 138 | 1403 | 15.5 | 1285 | 1.09 | 406 |
| 6 | 12.6 | 134 | 1429 | 13.8 | 1338 | 1.07 | 420 |
| 7 | 12.7 | 117 | 1466 | 11.7 | 1447 | 1.02 | 403 |
| 8 | 12.9 | 114 | 1525 | 11.4 | 1447 | 1.06 | 432 |
| 9 | 13.1 | 133 | 1397 | 15.8 | 1456 | 0.96 | 419 |
| 10 | 12.3 | 122 | 1470 | 13.3 | 1440 | 1.02 | 423 |
| 11 | 23.3 | 159 | 2654 | 27.9 | 2593 | 1.02 | 660 |
| 12 | 23.3 | 162 | 3309 | 27.0 | 3158 | 1.05 | 898 |
| 13 | 25.0 | 160 | 2738 | 27.2 | 2772 | 0.99 | 661 |

The results in TABLE 8 demonstrate the wide range of properties, including basis weight, caliper, and CD wet tensile, that can be imparted to products according to our invention. Without being bound by theory, it is believed that these properties are at least partially made possible through the unique nature of the structuring fabric used to form the products. For example, as discussed above, the planar volumetric index of the structuring fabric has a significant effect on the properties of the products, and the planar volumetric index of the structuring fabric is much different than the planar volumetric indexes of other structuring fabrics known in the art.

Although this invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

INDUSTRIAL APPLICABILITY

The invention can be used to produce desirable paper products such as hand towels. Thus, the invention is applicable to the paper products industry.

We claim:

1. A cellulosic sheet having a first surface and a second surface, the cellulosic sheet comprising:
   a single ply providing the first surface of the cellulosic sheet on one side and the second surface of the cellulosic sheet on a second side,
   wherein the single ply has (i) a caliper of at least about 130 mils/8 sheets, (ii) a basis weight of less than about 16 lbs/ream, and (iii) a dry machine direction/cross machine direction (MD/CD) tensile ratio of less than about 1.0.

2. The cellulosic sheet according to claim 1, wherein the single ply has a caliper of at least about 160 mils/8 sheets.

3. The cellulosic sheet according to claim 1, wherein the single ply has a basis weight of less than about 13 lbs/ream.

4. The cellulosic sheet according to claim 1, wherein the single ply has a saturation (SAT) capacity of at least about 325 g/m².

5. The cellulosic sheet according to claim 4, wherein the single ply has an SAT capacity of at least about 350 g/m².

6. The cellulosic sheet according to claim 1, wherein the single ply has a dry MD/CD tensile ratio of about 0.85 to about 1.0.

7. A cellulosic sheet made by a method that comprises:
   (a) forming an aqueous cellulosic web on a structuring fabric in a papermaking machine;
   (b) non-compactively dewatering the cellulosic web on the structuring fabric; and
   (c) drying the cellulosic web to form a single ply cellulosic sheet, wherein a portion of the structuring fabric on which the cellulosic web is formed has an adjusted planar volumetric index of at least about 27, and wherein the single ply has (i) a caliper of at least about 130 mils/8 sheets, (ii) a basis weight of less than about 16 lbs/ream, and (iii) a dry machine direction/cross machine direction (MD/CD) tensile ratio of less than about 1.0.

8. The cellulosic sheet according to claim 7, wherein the single ply has a caliper of at least about 160 mils/8 sheets.

9. The cellulosic sheet according to claim 7, wherein the single ply has a basis weight of less than about 13 lbs/ream.

10. The cellulosic sheet according to claim 7, wherein the single ply has a saturation (SAT) capacity of at least about 325 g/m$^2$.

11. The cellulosic sheet according to claim 10, wherein the single ply has an SAT capacity of at least about 350 g/m$^2$.

12. The cellulosic sheet according to claim 7, wherein the single ply has a dry MD/CD tensile ratio of about 0.85 to about 1.0.

13. The cellulosic sheet according to claim 7, wherein the adjusted planar volumetric index of the structuring fabric is about 27 to about 31.5.

14. The cellulosic sheet according to claim 7, wherein the adjusted planar volumetric index includes two variables: a contact area ratio (CAR) and an effective pocket volume (EPV).

15. The cellulosic sheet according to claim 14, wherein the CAR is defined as the ratio of the contact area formed by knuckles in the structuring fabric to an open area in the web contacting side of the structuring fabric.

16. The cellulosic sheet according to claim 15, wherein the EPV is defined as an average volume of pockets in the structuring fabric in which cellulosic fibers of the web may migrate during a papermaking operation.

17. The cellulosic sheet according to claim 16, wherein the adjusted planar volumetric index is defined as the CAR multiplied by the EPV multiplied by one hundred.

* * * * *